United States Patent
Atkinson

(10) Patent No.: US 9,340,087 B2
(45) Date of Patent: May 17, 2016

(54) ADJUSTABLE HEIGHT TRAILER

(71) Applicant: James P. Atkinson, Hyrum, UT (US)

(72) Inventor: James P. Atkinson, Hyrum, UT (US)

(*) Notice: Subject to any disclaimer, the term of this patent is extended or adjusted under 35 U.S.C. 154(b) by 0 days.

(21) Appl. No.: 13/862,273

(22) Filed: Apr. 12, 2013

(65) Prior Publication Data

US 2014/0306425 A1   Oct. 16, 2014

Related U.S. Application Data

(60) Provisional application No. 61/623,358, filed on Apr. 12, 2012.

(51) Int. Cl.
| | | |
|---|---|---|
| *B60G 17/00* | (2006.01) | |
| *B60G 9/02* | (2006.01) | |
| *B62D 33/023* | (2006.01) | |
| *B60G 15/06* | (2006.01) | |
| *B62D 33/037* | (2006.01) | |
| *B60G 13/00* | (2006.01) | |
| *B60D 1/06* | (2006.01) | |
| *B60D 1/14* | (2006.01) | |
| *B60D 1/155* | (2006.01) | |
| *B60D 1/46* | (2006.01) | |
| *B62D 63/06* | (2006.01) | |

(52) U.S. Cl.
CPC ............... *B60G 15/067* (2013.01); *B60D 1/06* (2013.01); *B60D 1/143* (2013.01); *B60D 1/155* (2013.01); *B60D 1/46* (2013.01); *B60G 9/02* (2013.01); *B60G 13/003* (2013.01); *B60G 17/00* (2013.01); *B62D 33/023* (2013.01); *B62D 33/037* (2013.01); *B60G 2204/61* (2013.01); *B60G 2300/04* (2013.01); *B60G 2300/38* (2013.01); *B60G 2500/30* (2013.01); *B62D 63/062* (2013.01)

(58) Field of Classification Search
CPC .... B62D 21/20; B62D 33/023; B62D 33/037; B60G 17/00; B60G 17/0054; B60G 9/02; B60G 2500/30; B60G 2400/25; B60G 2300/04; B60G 15/067; B60J 7/185; B60J 7/198; B60J 7/19
USPC ............ 280/5.514, 6.15, 6.154, 6.155, 6.156, 280/6.157, 789, 124.11, 124.128; 296/51
See application file for complete search history.

(56) References Cited

U.S. PATENT DOCUMENTS

| | | | | | |
|---|---|---|---|---|---|
| 2,474,296 | A | * | 6/1949 | Wiltsce | ......................... 280/475 |
| 2,549,129 | A | * | 4/1951 | Pickett | ..................... B60R 9/06 |
| | | | | | 224/410 |
| 2,563,372 | A | * | 8/1951 | Risse | ........................ 280/490.1 |

(Continued)

*Primary Examiner* — Barry Gooden, Jr.
(74) *Attorney, Agent, or Firm* — Durham, Jones & Pinegar, P.C. Intellectual Property Law Group

(57) ABSTRACT

A trailer is disclosed. The trailer may be pulled behind a vehicle such as, but not limited to, a jeep, dune buggy, or ATV. Embodiments of the trailer may include a frame and an adjustable suspension. The adjustable suspension may be used to vary the height of the trailer in order to accommodate different types of terrain and loading. By changing the height, the clearance and/or approach angle of the trailer may be varied. Additional embodiments may include a tongue connected to the frame, which tongue may have an adjustable length and/or height. Where the trailer includes a cover and a tailgate, an optional locking system may be used. In one embodiment, the locking system includes a handle that may release both the tailgate and cover. In some embodiments, the handle may be partially pulled to release the cover while fully pulling the handle may release the tailgate.

17 Claims, 21 Drawing Sheets

(56) References Cited

U.S. PATENT DOCUMENTS

| | | | |
|---|---|---|---|
| 2,742,317 A * | 4/1956 | Chandler | B62D 33/0273 292/40 |
| 2,806,710 A * | 9/1957 | Mascaro | 280/414.5 |
| 2,944,862 A * | 7/1960 | Heil | 312/237 |
| 2,990,966 A * | 7/1961 | Schramm | 414/476 |
| 3,014,327 A * | 12/1961 | Bumm et al. | 56/1 |
| 3,591,198 A * | 7/1971 | Brando | 280/124.125 |
| 3,833,237 A * | 9/1974 | Sweet et al. | 280/5.514 |
| 3,843,163 A * | 10/1974 | Hale | 280/490.1 |
| 4,178,005 A * | 12/1979 | Kent, Jr. | 280/43.18 |
| 4,302,022 A * | 11/1981 | Schoeffler | B60G 17/00 280/417.1 |
| 4,379,572 A * | 4/1983 | Hedenberg | 280/86.75 |
| 4,453,735 A * | 6/1984 | Penverne et al. | 280/43.18 |
| 4,610,457 A * | 9/1986 | Harmon | 280/204 |
| 5,161,814 A * | 11/1992 | Walker | 280/414.5 |
| 5,320,397 A * | 6/1994 | Peterson | B62D 33/0273 296/180.1 |
| 5,513,868 A * | 5/1996 | Barr | 280/400 |
| 5,706,901 A * | 1/1998 | Walters et al. | 172/439 |
| 5,934,698 A * | 8/1999 | Despain | 280/490.1 |
| 6,042,137 A * | 3/2000 | McIntosh | 280/490.1 |
| 6,189,748 B1 * | 2/2001 | Hutter et al. | 224/42.21 |
| 6,220,397 B1 * | 4/2001 | Beng | B60B 39/00 188/16 |
| 6,234,561 B1 * | 5/2001 | Huotari | B60J 7/10 296/100.15 |
| 6,254,117 B1 | 7/2001 | Cross | |
| 6,322,129 B2 * | 11/2001 | Huotari | 296/100.15 |
| 6,558,079 B1 * | 5/2003 | Kozak et al. | 405/129.15 |
| 6,702,358 B2 * | 3/2004 | Comstock | B60J 7/10 292/144 |
| 6,827,386 B2 * | 12/2004 | Stevenson | 296/51 |
| 6,923,475 B1 * | 8/2005 | Martin et al. | 280/789 |
| 6,923,488 B2 * | 8/2005 | Bruford et al. | 296/57.1 |
| 6,938,941 B2 * | 9/2005 | Thiele | B60P 1/26 16/334 |
| 7,055,848 B1 | 6/2006 | James | |
| 7,156,591 B2 * | 1/2007 | Marola | 410/23 |
| 7,234,720 B2 * | 6/2007 | Borglum | 280/414.5 |
| 7,618,227 B2 * | 11/2009 | Smith | 414/484 |
| 7,736,115 B2 * | 6/2010 | Lambert | 414/474 |
| 7,740,265 B2 * | 6/2010 | Lundin | 280/476.1 |
| 7,874,610 B2 * | 1/2011 | Khalighi | B62D 33/0273 296/180.1 |
| 7,918,465 B2 | 4/2011 | Metzger | |
| 7,950,675 B1 * | 5/2011 | Quenzi et al. | 280/6.157 |
| 7,997,605 B2 | 8/2011 | Kittrell | |
| 8,096,729 B2 * | 1/2012 | Galik | 405/3 |
| 8,205,893 B2 * | 6/2012 | Peterson et al. | 280/6.157 |
| 8,419,039 B1 * | 4/2013 | Magalhaes et al. | 280/490.1 |
| 8,485,536 B1 * | 7/2013 | Pierce | 280/5.52 |
| 8,622,429 B2 * | 1/2014 | Ardagna | 280/786 |
| 8,677,907 B2 * | 3/2014 | Graaff et al. | 105/4.1 |
| 8,720,956 B2 * | 5/2014 | Murray | 292/48 |
| 8,727,360 B2 * | 5/2014 | Catford | 280/43.18 |
| 8,740,279 B1 * | 6/2014 | McGoff | E05B 83/20 296/51 |
| 2003/0230909 A1 * | 12/2003 | Melius et al. | 296/98 |
| 2004/0222656 A1 * | 11/2004 | Stevenson | 296/51 |
| 2005/0067851 A1 * | 3/2005 | Kang et al. | 296/51 |
| 2005/0264024 A1 * | 12/2005 | Mulder | B60J 7/1621 296/100.07 |
| 2006/0186616 A1 * | 8/2006 | Rudiger | 280/6.15 |
| 2007/0029833 A1 * | 2/2007 | Kuhr | B60J 7/205 296/76 |
| 2008/0012266 A1 | 1/2008 | Lee | |
| 2008/0252092 A1 * | 10/2008 | Waldner | B62D 33/0273 296/51 |
| 2008/0292400 A1 * | 11/2008 | Roth | 404/90 |
| 2009/0194968 A1 * | 8/2009 | Ardagna | 280/460.1 |
| 2010/0135724 A1 * | 6/2010 | Roth | 404/124 |
| 2010/0320739 A1 * | 12/2010 | Kittrell | 280/789 |
| 2011/0032484 A1 * | 2/2011 | Seal | 353/13 |
| 2011/0038699 A1 | 2/2011 | Nguyen | |
| 2011/0233897 A1 * | 9/2011 | Moore, Jr. | 280/477 |
| 2012/0126564 A1 * | 5/2012 | Hausler | B62D 33/0273 296/62 |
| 2013/0049379 A1 * | 2/2013 | Yokota | E05B 81/20 292/129 |
| 2013/0140792 A1 * | 6/2013 | Harkcom et al. | 280/494 |

* cited by examiner

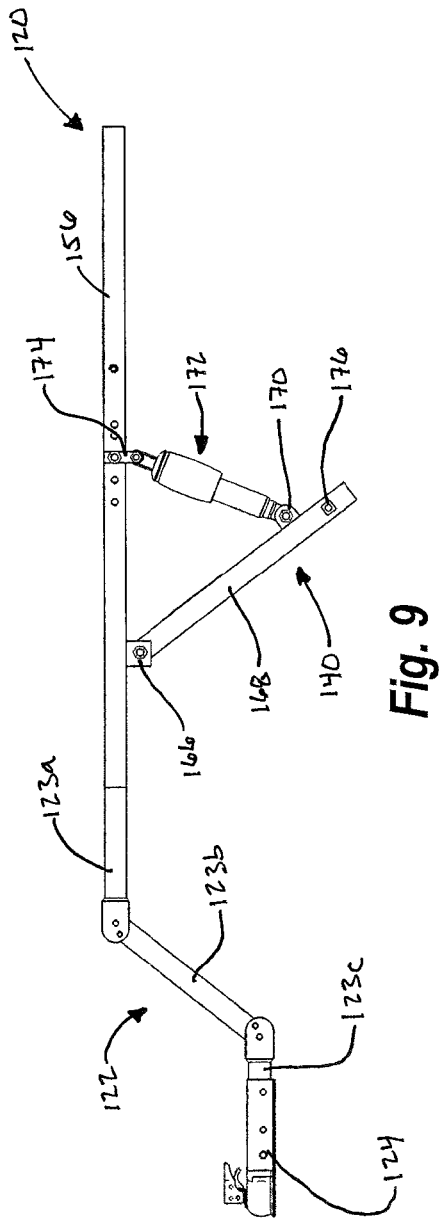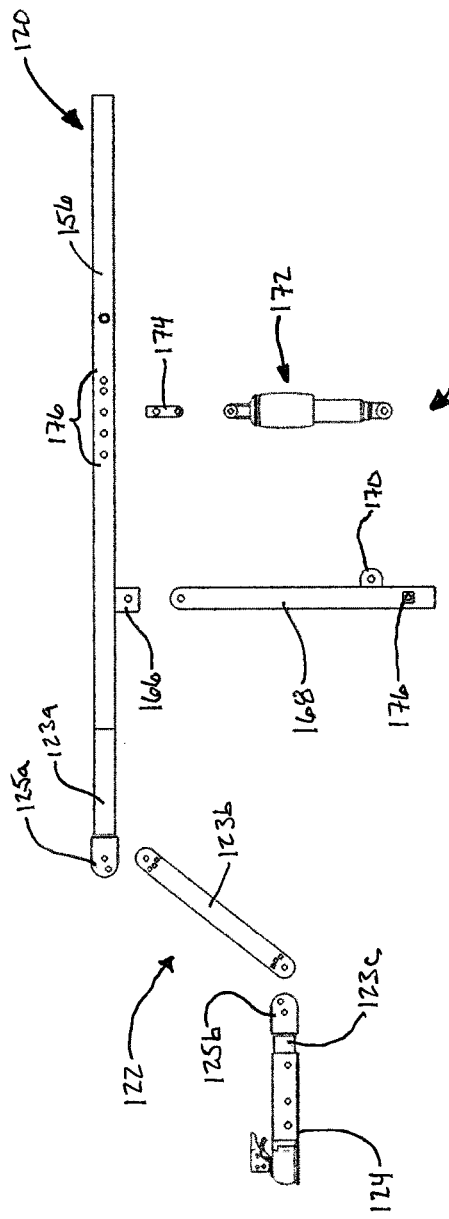

ADJUSTABLE HEIGHT TRAILER

CROSS-REFERENCE TO RELATED APPLICATIONS

This application is a non-provisional patent application claiming the benefit of, and priority to, U.S. Patent Application Ser. No. 61/623,358 filed on Apr. 12, 2012, entitled "ADJUSTABLE HEIGHT TOW-BEHIND TRAILER", and naming the same inventor as listed on the present application, namely James "Jim" P. Atkinson. The foregoing application is expressly incorporated herein by this reference in its entirety.

FIELD OF THE DISCLOSURE

The present disclosure relates to vehicles. More particularly, embodiments of the present disclosure relate to all-terrain vehicles (ATVs). More particularly still, embodiments of the present disclosure relate to pull-behind trailers which can be towed behind an ATV to carry supplies, people, other vehicles, and the like.

BACKGROUND

Many wilderness and other areas are uniquely suited for use with off-road vehicles. In some cases, the terrain of such an area makes access difficult. For instance, large rocks and boulders, muddy or sandy soil, rapid topographical changes, narrow trails and passageways, and the like may make it difficult to use a traditional land vehicle, such as a family car, to access the area. Instead, a user may access the areas by using an off-road vehicle more suited to rugged and/or changing terrain. Example off-road vehicles may include vehicles small enough to maneuver around large rocks and to access more narrow canyons and trails.

A typical small-scale off-road vehicle may include a dirt bike, ATV, or the like. Other off-road vehicles may include a four-wheel drive vehicle. In the example of an ATV, the vehicle may include a frame and seat carried by four wheels. A gas-powered motor may be secured to the frame and used to drive the wheels. A steering assembly can include handlebars for steering and maneuvering the vehicle. Often, the seat and frame may support a single rider and possibly one passenger, although larger ATVs are increasingly being produced to accommodate increased numbers of passengers.

While the small size of many ATVs may make it possible to use them to access remote locations, the size can also mean the ATV has a reduced capacity to carry large quantities of gear, supplies, and the like. Reduced carrying capacity may therefore make it difficult to carry sufficient gasoline for a long trek, or other supplies for camping, hunting, fishing, and the like. Indeed, while some ATVs include front and rear racks to somewhat increase the carrying capacity, they may nonetheless lack sufficient carrying capacity for a long trail and/or an expedition where many supplies are needed. Moreover, while some ATVs may include a trailer hitch to attach to a trailer to increase capacity, the off-road conditions, including steep incline changes and transverse slopes, make towing a trailer difficult or dangerous.

SUMMARY

An embodiment of the present disclosure may relate to a trailer having an adjustable height. In at least one embodiment, the trailer may include a frame connected to an adjustable suspension. By adjusting the suspension, the clearance of the trailer may be selectively varied.

An embodiment of the present disclosure may relate to an adjustable suspension system. An example adjustable suspension system may include a trailing suspension arm pivotally secured to a fixed pivot. The trailing suspension arm may pivotally secure to a second suspension arm which optionally includes a shock absorber. The second suspension arm may pivotally secure to an additional pivot that is selectively secured to the frame. The additional pivot and fixed pivot may be secured to the same frame element, at different longitudinal positions along the frame element.

Another embodiment of the present disclosure relates to a trailer, and includes a frame and two or more wheels connected to the frame. An enclosure is connected to the frame and includes at least three sidewalls, a tailgate, and a top cover. An adjustable suspension is connected to the frame to selectively vary the clearance of the frame relative to a bottom of the two or more wheels, and to vary a longitudinal location of the two or more wheels. A tongue may be connected to the frame and have an adjustable drop and/or length.

BRIEF DESCRIPTION OF THE DRAWINGS

In order to describe the manner in which features and other aspects of the present disclosure can be obtained, a more particular description of certain embodiments that fall within the broad scope of the disclosed subject matter will be rendered in the appended drawings. The above drawings are generally drawn to scale for some embodiments, but are not drawn to scale for all embodiments contemplated hereby. Understanding that these drawings only depict example embodiments and are not therefore to be considered to be limiting in scope, various embodiments will be described and explained with additional specificity and detail through the use of the accompanying drawings in which:

FIG. 9 is a side view of example suspension and hitching systems usable with the tow-behind trailer of FIGS. 1A and 1B, according to an embodiment of the present disclosure;

FIG. 10 is an exploded side view of the suspension and hitching systems of the tow-behind trailer of FIG. 9, according to an embodiment of the present disclosure;

DETAILED DESCRIPTION

Systems, assemblies, devices, trailers, and methods according to the present disclosure may relate to off-road vehicles, trailers, suspension systems, or any combination of the foregoing. By way of example and not limitation, a hauling system may include a hauling vehicle with a tow-behind trailer. The hauling vehicle may include a so-called ATV, although any number of other vehicles may be included. For instance, an ATV having four and capable of carrying up to two passengers may be used. In other embodiments, an ATV may have six or more wheels and/or be capable of carrying larger numbers of passengers. In other embodiments, the hauling vehicle may include any other vehicle, including a dune buggy, four-wheel drive vehicle, a recreational vehicle, or even a traditional car or truck.

In some embodiments, aspects of some embodiments of the present disclosure relate to a tow-behind trailer for towing behind any suitable vehicle. Optionally, the tow-behind trailer may have a trailer bed elevated from the lower surface of the tires, which elevation may be sufficient to provide a clearance for use in off-road use in a variety of conditions and terrain, and for hauling any number of different types of loads. The clearance may optionally be adjustable to allow a user to customize the degree of clearance and potentially the position of a wheel base relative to the trailer frame. In some embodiments, a hitching assembly may be adjustable to, for instance, account for changes to the trailer clearance.

Figure 1A:
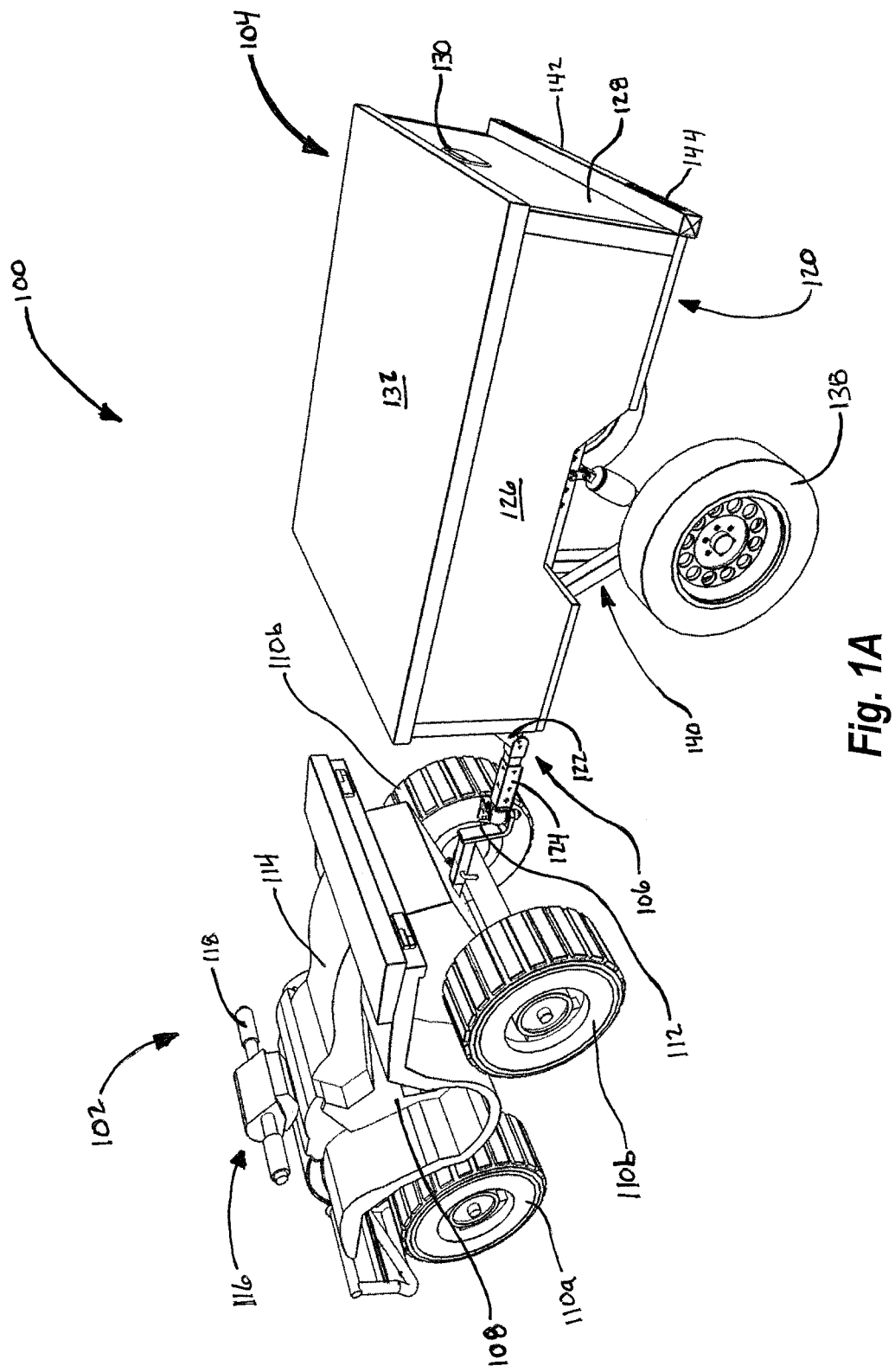
FIG. 1A is a perspective view of an off-roading system including an ATV and a tow-behind trailer, according to an embodiment of the present disclosure.
Figure 1B:
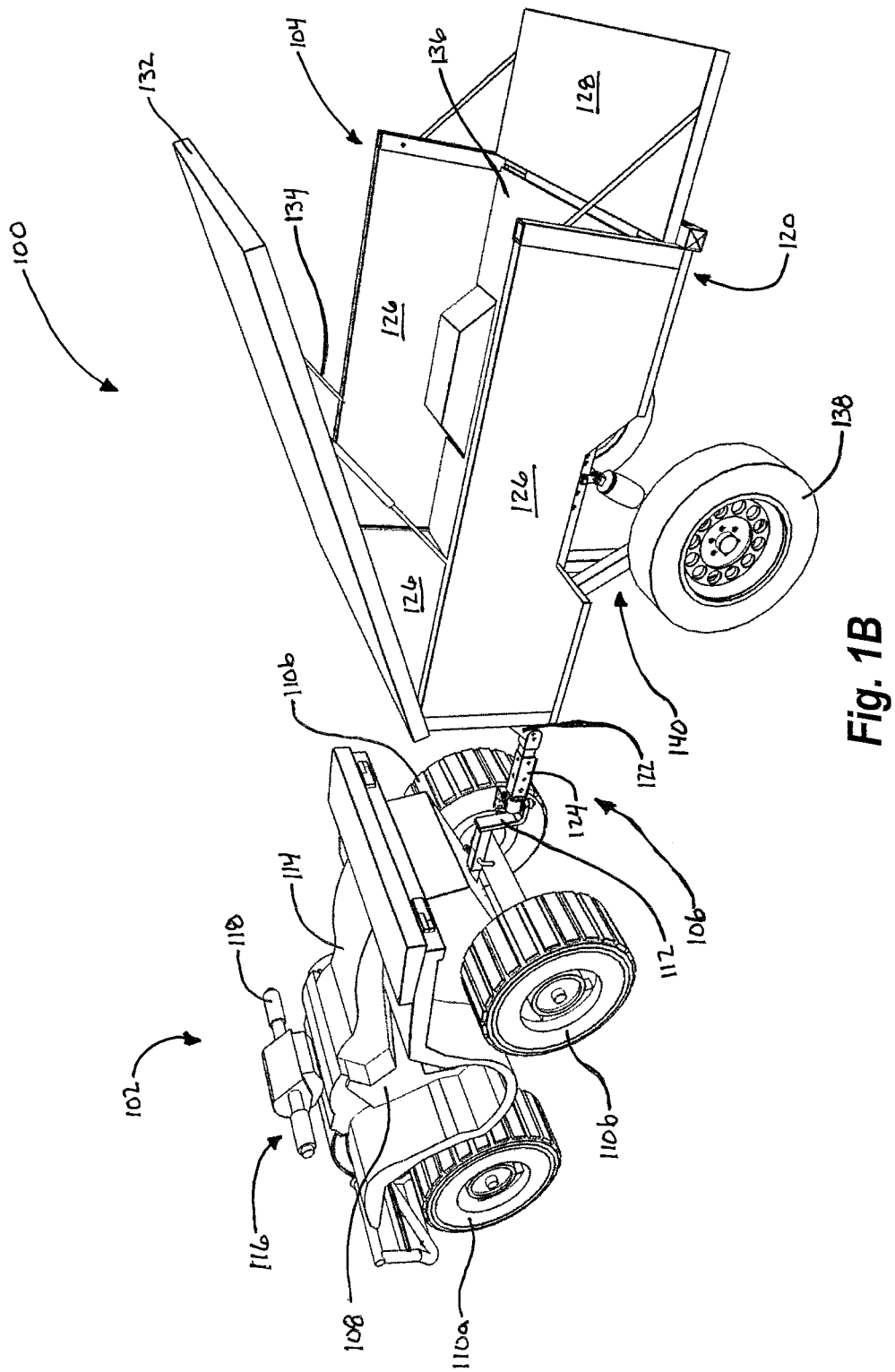
FIG. 1B is a perspective view of the off-roading system of FIG. 1A, and includes the off-roading trailer in an open configuration, according to an embodiment of the present disclosure.

Turning now to FIGS. 1A and 1B, an example towing system 100 is shown in additional detail. In the particular embodiment shown in FIGS. 1A and 1B, the towing system 100 is illustrated as an off-roading system. In some embodiments, the towing system 100 may therefore be referred to as an off-roading system; however, such a reference should not be interpreted as limiting any embodiment hereof to only use in any particular environment, as embodiments herein may be used in any number of different environments, including in off-road, highway, construction, and other environments.

The off-roading system 100 of FIGS. 1A and 1B is shown as including an ATV 102 for hauling a trailer 104. The trailer 104 is adapted to be coupled to the ATV 102 in any conventional or other manner. For instance, in the illustrated embodiment, the ATV 102 and trailer 104 are shown as including mating components of a hitching system 106. An example hitching system 106 may include a trailer tongue attached to a ball coupler, while the ATV may include a ball hitch. In other embodiments, however, other components may be used in the hitching system 106. For instance, the hitching system 106 may include tow loop, pintle hitch, clevis hitch, or other hitching components for securing the trailer 104 to the ATV 102. In some embodiments, a hitch may be used to restrict movement in one direction, while allowing movement in one or more other directions. A ball hitch may, for instance, generally restrict lateral movement while allowing the coupler to rotate around the top of the ball hitch. An other type of hitch, however, may restrict lateral movement while allowing up and down rotation. Other types of hitches, or combinations of the foregoing, may also be used.

While not limiting of the present disclosure, the ATV 102 used for towing the trailer 104 may include various components. In FIGS. 1A and 1B, for instance, the ATV 102 includes a chassis 108 having some number of wheels 110 (e.g., four, six, or more wheels) attached thereto. In this particular embodiment, the ATV includes two front wheels 110a and two rear wheels 110b. A component of the hitching system (e.g., hitch mount 112) may extend rearwardly from the chassis 108 and between the rear wheels 110b. A seat 114 may also be mounted directly or indirectly to the chassis 108. A steering assembly 116, which in this embodiment may include handlebars 118, may also attach to the front wheels 110a to facilitate steering of the ATV 102.

Increased hauling capabilities may be provided by connecting the trailer 104 to the ATV 102. For instance, on an ATV trip to a remote location, or on a long trail, the trailer 104 may be used to carry supplies (e.g., fuel, food, bedding, medical supplies, fishing/hunting equipment, cooking implements, etc.). A carcass of a downed animal, or even an injured person, could also potentially be transported using the trailer 104. Of course, the trailer 104 may also be used to carry any number of other items in addition to, or instead of, those specifically disclosed herein.

In the illustrated embodiment, the trailer 104 may include a frame 120 for providing structural strength to the trailer 104. Attached to the frame 120 may be a tongue 122 of the hitching system 106. As disclosed herein, a non-limiting example of a hitching system 106 may include a ball hitch attached to the ATV 102, in which case a front end of the tongue 122 may connect to a ball-type coupler 124.

The frame 120 may be constructed in any number of manners. In some embodiments, the frame 120 may generally define all or a portion of the shape of the trailer 104. Some components of the frame 120 may define the shape of the trailer while other components provide reinforcement or other structural or cosmetic features.

In the illustrated embodiment, the trailer 104 can define an enclosure into which items may be placed. Such an enclosure may be fully enclosed or partially enclosed, depending on the embodiment. In this particular example, the enclosure may be formed by a set of side panels 126 mounted to the frame 120, and which form the front and sides of the enclosure of the trailer 104. Optionally, a rear side, which is shown in FIGS. 1A and 1B as a tailgate 128, may also be connected to the frame 120 and define the enclosure. The tailgate 128 may be upright as shown in FIG. 1A. In other embodiments, however, the tailgate may be moveable between multiple positions (e.g., upright and closed in FIG. 1A and extended and open in FIG. 1B). An optional handle 130 may be used to move the tailgate 128 between positions. The tailgate 128 may be fully removable, or may be hinged or otherwise secured to allow pivotal movement relative to the frame 120.

The trailer 104 may be open at a top; however, in other embodiments a cover may be placed over the top. FIG. 1A, for instance, illustrates a top cover 132 which can cover all, or substantially all, of the top of the trailer 104. In this particular embodiment, for instance, the top cover can cover the enclosure defined by the sides 126 and tailgate 128. Optionally, the top cover 132 may be slightly oversized, and can even include sides to overhang and overlap the side panels 126 and/or tailgate 128. An overlap may be used to provide protection against the elements (e.g., a weather-proof or water-proof seal).

The top cover 132 may also be fully or partially removable. FIG. 1B, for instance, illustrates the top cover 132 as being at least partially removable. In this embodiment, the top cover 132 may be opened from the rear and inclined relative to the trailer 104. Optionally, the top cover 132 may be hinged or otherwise pivotally mounted at or near a front end of the trailer 104 so as to pivotally open. In other embodiments, however, the top cover 132 may slide or otherwise open, pivot to a side, pop-up, be fully removable, or otherwise move or be removed in any other manner, or using some combination of the foregoing. As shown in FIG. 1B, to support the top cover 132 in an inclined, open position, a set of one or more supports 134 may connect to the top cover 132 and a side 126 and/or the frame 120. In some embodiments, the supports 134 may include struts (e.g., gas struts) to assist in opening the top cover 132 in addition to, or instead of, merely supporting the top cover 132 in an open position. When the top cover 132 is open, a floor 136 of the trailer 104 may be shown. Together with the top cover 132, sides 126, and tailgate 128, the floor 136 may define an enclosure of the trailer 104.

A set of wheels 138 may be provided and connected to the trailer frame 104 (e.g., using a hub or axle about which the wheels 138 rotate). As is shown in FIGS. 1A and 1B, the wheels 138 may also be connected to a suspension system 140. The suspension system 140 may have any suitable construction. As described in greater detail hereafter, some embodiments contemplate a suspension system 140 that is adjustable. An adjustable suspension system 140 may be used to, for instance, raise and lower the trailer 104. By raising or lowering the trailer 104, the clearance under the trailer 104 may be changed. The clearance may be changed to alter the approach angle of the trailer or otherwise facilitate maneuvering over rugged terrain, in narrow conditions or the like. Optionally, the suspension system 140 may also, or alternatively, change the wheel position relative to the trailer 104. For instance, the wheels 138 may be moved forward or rearward, thereby changing the center of gravity of the trailer 104.

A trailer such as trailer 104 of FIGS. 1A and 1B may also include additional or other components. For instance, the suspension system 140 may include shock absorbers to dampen vibrations as the trailer 104 is pulled along a road, trail, or other terrain. In some embodiments, shocks may be adjustable to vary the dampening effects of the suspension system 140 and/or to change a height of the trailer 104. In some embodiments, the suspension system 140 may have a fixed height, whether or not it includes shocks or other similar components. In other embodiments, the trailer 104 may also include other components (e.g., bumper 142, lights 144, electrical wiring, pneumatic or hydraulic control systems, interior dividers, a braking system, etc.).

Turning now to FIGS. 2-6, additional views of the trailer 104 of FIGS. 1A and 1B are shown to illustrate additional, optional aspects of the some embodiments of the present disclosure.

As discussed herein, an aspect of some embodiments of the present disclosure is that a trailer 104 may be used in an off-road environment. Such a trailer 104 may be suitable for rocky, narrow, sandy, or other terrain. The trailer 104 may additionally, or alternatively, be loaded in different manners (e.g., high vs. low load weights) while maintaining stability.

Figure 2:
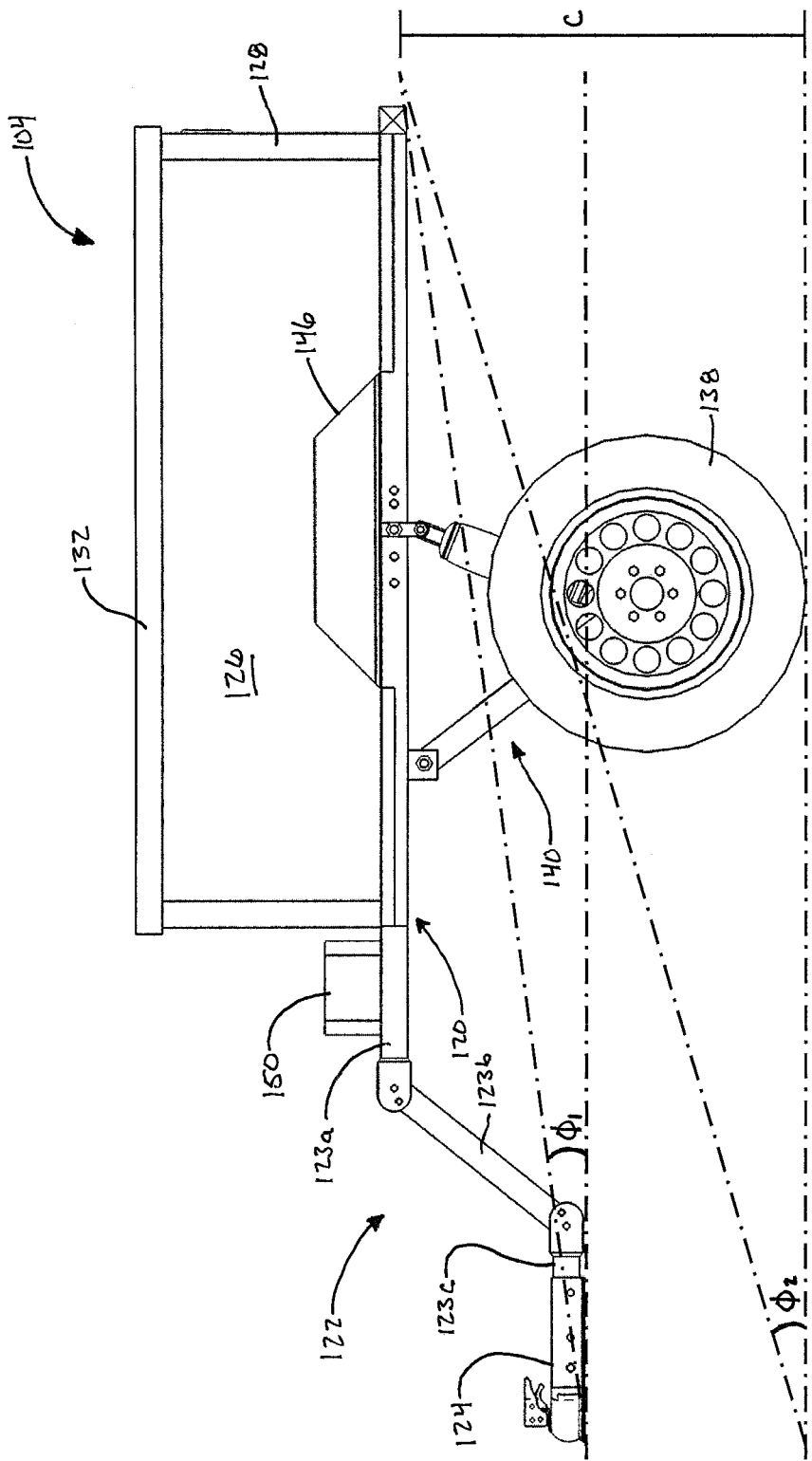
FIG. 2 is a side view of the tow-behind trailer of the off-roading system of FIGS. 1A and 1B, according to an embodiment of the present disclosure.

FIG. 2 illustrates a particular aspect of some embodiments of the present disclosure in which the trailer 104 may include a relatively high clearance. In particular, a trailer may often include a wheel well into which a wheel 138 is positioned. As shown in FIG. 2, however, the wheels 138 may be spaced apart from a wheel well 146. Accordingly, the wheel well 146 may even be omitted in some embodiments.

When the wheel 138 rites within, or near, the wheel well 146, there may be a relatively lower clearance as compared to when the wheel 146 is spaced apart from the wheel well 146 as shown in FIG. 2. In particular, the clearance may be represented by the identifier "C" in FIG. 2, and may generally be described as a distance between the bottom of the wheels 138 and the bottom of the frame 120. The further the wheels 138 are separated from the frame 120 and the wheel wells 146 attached to the frame 120, the larger the clearance.

The amount of clearance may be varied based on any number of factors. In some embodiments, for instance, the clearance C may be between about eight and about fifteen inches. Such clearance may be particularly suited for use on a roadway or generally level terrain. Even in some level terrain, however, low clearance C may cause the trailer 104 to get stuck. In sandy terrain, for instance, the wheels 138 may sink into the sand, causing the frame 120 to contact the sand and potentially get stuck therein.

A relatively low clearance C may also make use of the trailer 104 difficult in rocky or other rugged terrain. For instance, rocks larger than eight to fifteen inches in diameter may be on a trail. If the trailer 104 is moved towards such obstructions, the obstruction may block or damage the trailer 104. To allow increased maneuverability over even large obstructions, the clearance C may be increased in some embodiments. For instance, the clearance C may be between about fourteen inches and about thirty inches in some embodiments, although such clearances are merely illustrative, and the clearance C may be even larger than thirty inches or less than fourteen inches.

Typically, an ATV or other vehicle has a hitch mount at a generally fixed height. For instance, that height may be between about eight and about twelve inches in some embodiments, although the height may be higher or lower in other embodiments. One aspect of increasing the clearance C of the trailer 104 is that the trailer 104 may ride higher, and potentially much higher, than the hitch on the hauling vehicle. To account for such a difference, the illustrated trailer 104 includes a tongue 122 that can drop down to a lower hitch mount. In this particular embodiment, the tongue 122 may be elongated and can include one or more sections that change direction and/or height. For instance, the tongue 122 may include an upper section 123a connected to the frame 120. The upper section 123a may extend forwardly from the front side of the frame 120. An intermediate section 123b may then connect to the upper section 123a and further extend forward. In FIG. 2, the intermediate section 123b is also shown as being downwardly inclined. The particular degree of incline may vary. For instance, the intermediate section 123b may extend between zero and forty-five degrees off the horizontal. In other embodiments, the intermediate section 123b may be inclined more than forty-five degrees off a horizontal. In still other embodiments, the intermediate section 123b may even extend upward (e.g., where clearance C is reduced).

A lower section 123c of the tongue 122 may be located at the lower, front end of the intermediate section 123b. Optionally, the lower section 123 can extend forwardly and connect to the coupler 124 used to mount the trailer 104 to a hauling vehicle. Although not necessary, the upper and/or lower sections 123a, 123c may extend horizontally or perpendicularly relative to the frame 104.

When maneuvering the trailer 104, an approach angle may be defined. An approach angle may be defined in a number of manners. A first approach angle may, for instance, represent an angle between the coupler 124 at the front end of the trailer 104 and the back end of the frame 120. In FIG. 2, the back end of the frame 120 may occur at bumper 142, and the first approach angle is represented as angle $\Phi_1$. A second approach angle may represent an angle between the ground (or lower end of the wheels 138) at the forward most position of the tongue 122, and the back end of the frame 120. In FIG. 2, the second approach angle is shown as angle $\Phi_2$.

The approach angles may be varied based on a variety of factors, including the length of the tongue 122, the amount of drop in the tongue 122, the height of the trailer 104 (e.g., clearance C), the length of the trailer 104, and the like. In some embodiments, the first approach angle $\Phi_1$ may be up to about five degrees. In other embodiments, the first approach angle $\Phi_1$ may be up to about ten degrees. In one embodiment, for instance, the first approach angle $\Phi_1$ may be between about six degrees and about nine degrees. In other embodiments, the first approach angle $\Phi_1$ may exceed five to ten degrees. For instance, the first approach angle $\Phi_1$ may be between about ten degrees and about fifty degrees. In one embodiment, the first approach angle $\Phi_1$ may be between about twenty-five degrees and about forty-five degrees. In other embodiments, the first approach angle $\Phi_1$ may be less than about five degrees or greater than about fifty degrees.

The second approach angle $\Phi_2$ may similarly vary based on a variety of factors. In one embodiment, for instance, the second approach angle $\Phi_2$ may be up to about ten degrees, or up to about twenty-five degrees. In at least one embodiment, the second approach angle $\Phi_2$ may be between about fourteen and about twenty degrees. In still other embodiments, the second approach angle $\Phi_2$ may be between about twenty-five degrees and about sixty degrees. For instance, the second approach angle $\Phi_2$ may be between about thirty degrees and about fifty degrees. In other embodiments, the second approach angle $\Phi_2$ may be less than about ten degrees or greater than about sixty degrees. Moreover, as discussed herein, some embodiments contemplate a tongue 122 and/or suspension system 140 that is adjustable. In such embodiments, the first and/or second approach angles $\Phi_1$, $\Phi_2$ may change as adjustments are made.

As noted above, the approach angles can change based on more than the adjustments to the tongue 122 and/or suspension system 140. For instance, the length of the trailer 104 may result in a changed approach angle. As an example, the length of the enclosure of the trailer 104 may be about five feet in one embodiment. The tongue may extend forward about twenty-one inches, and drop about twelve inches. Where the clearance is about thirty inches, the first approach angle $\Phi_1$ may be about eight degrees while the second approach angle $\Phi_2$ may be about twenty-seven degrees. If, however, the length of the enclosure of the trailer 104 is increased to seven feet, the approach angle $\Phi_1$ may drop to about seven degrees while the second approach angel $\Phi_2$ may drop to about twenty-two degrees. Changing the length and/or drop of the tongue 122, shortening the trailer 104, increasing or decreasing the clearance C, may also have corresponding changes to the approach angles $\Phi_1$, $\Phi_2$.

Figure 3A:
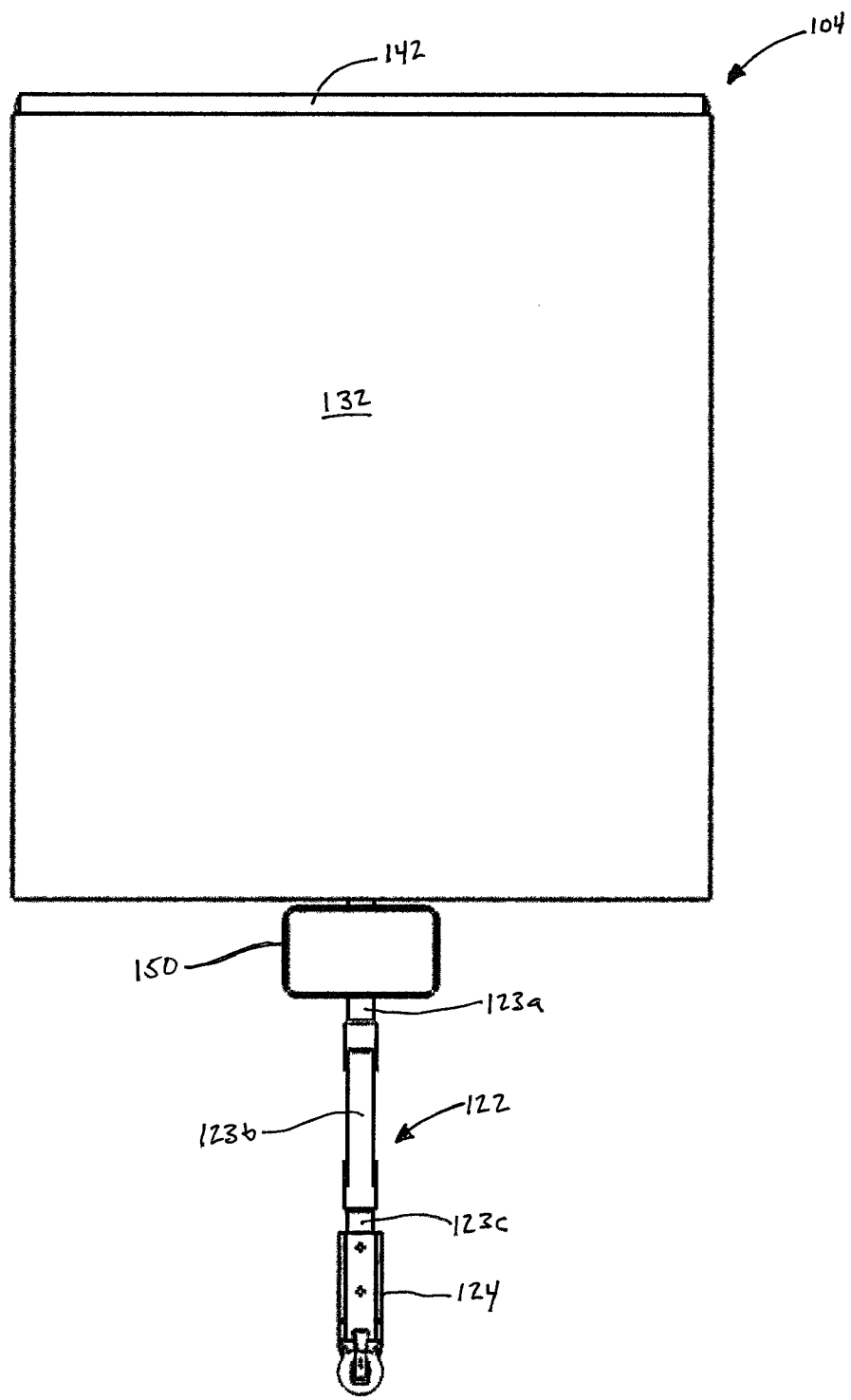
FIG. 3A is a top plan view of the tow-behind trailer of the off-roading system of FIGS. 1A and 1B, according to an embodiment of the present disclosure.

FIGS. 3A-6 illustrate other aspects of one embodiment of a trailer 104 in additional detail. FIG. 3A, for instance illustrates an example top view of the trailer 104, with a top cover 132 on the trailer. FIG. 3B, in contrast, illustrates an example top view of the trailer 104 with the top cover 132 removed and the interior exposed. As shown in FIG. 3B, one or more components may also be placed inside the enclosure of the trailer 104. As shown in FIG. 3B, one or more optional wheel wells 146 may take up some space in the interior of the trailer 104, although the wheel wells 146 may be removed in other embodiments, or may vary in size. If, for instance, the suspension system 140 (see FIG. 2) provides a clearance such that the wheels 138 are entirely outside of the wheel wells 146, they may be eliminated. With less clearance, the wheel wells 146 may only partially contain the wheels 138, so that the wheel wells 146 may have a reduced depth and/or length. Changing the size of the wheels 138 (e.g., between twenty and twenty-five inch wheels) may also allow the wheel wells 146 to vary in size. Of course, should the wheels 138 be moved laterally outside of the footprint of the frame 120, the width of the wheel wells 146 may be reduced, or potentially the wheel wells 146 may be eliminated entirely.

Figure 3B:
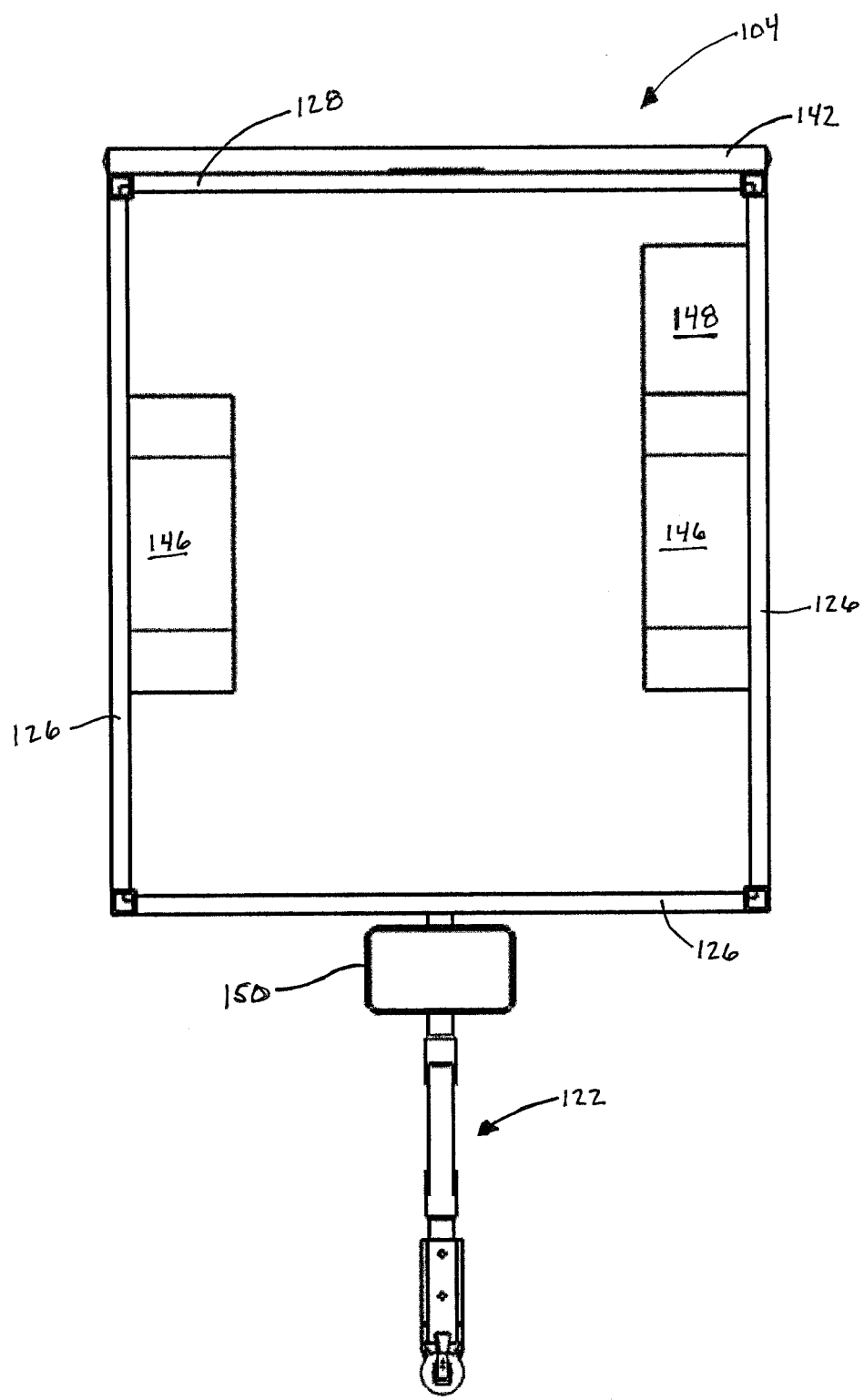
FIG. 3B is a top plan view of the tow-behind trailer of the off-roading system of FIGS. 1A and 1B, with a top cover removed and exposing an interior of the trailer, according to an embodiment of the present disclosure.
Figure 4:
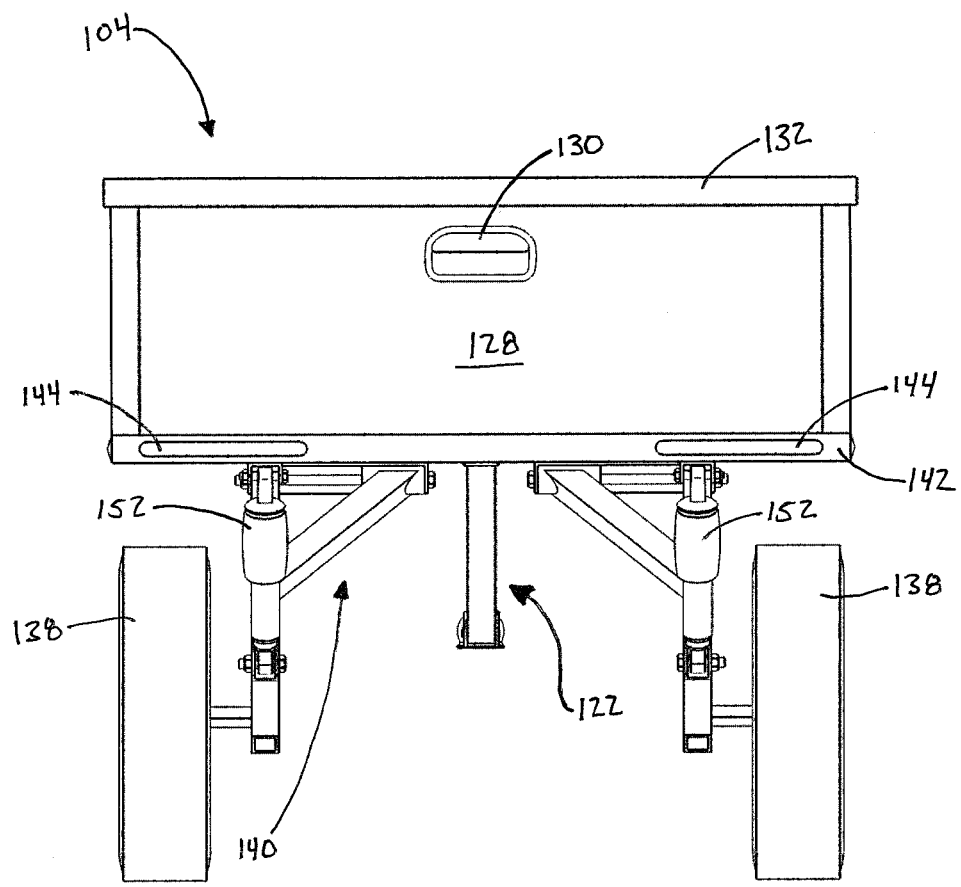
FIG. 4 is a rear view of the tow-behind trailer of the off-roading system of FIGS. 1A and 1B, according to an embodiment of the present disclosure.
Figure 5:
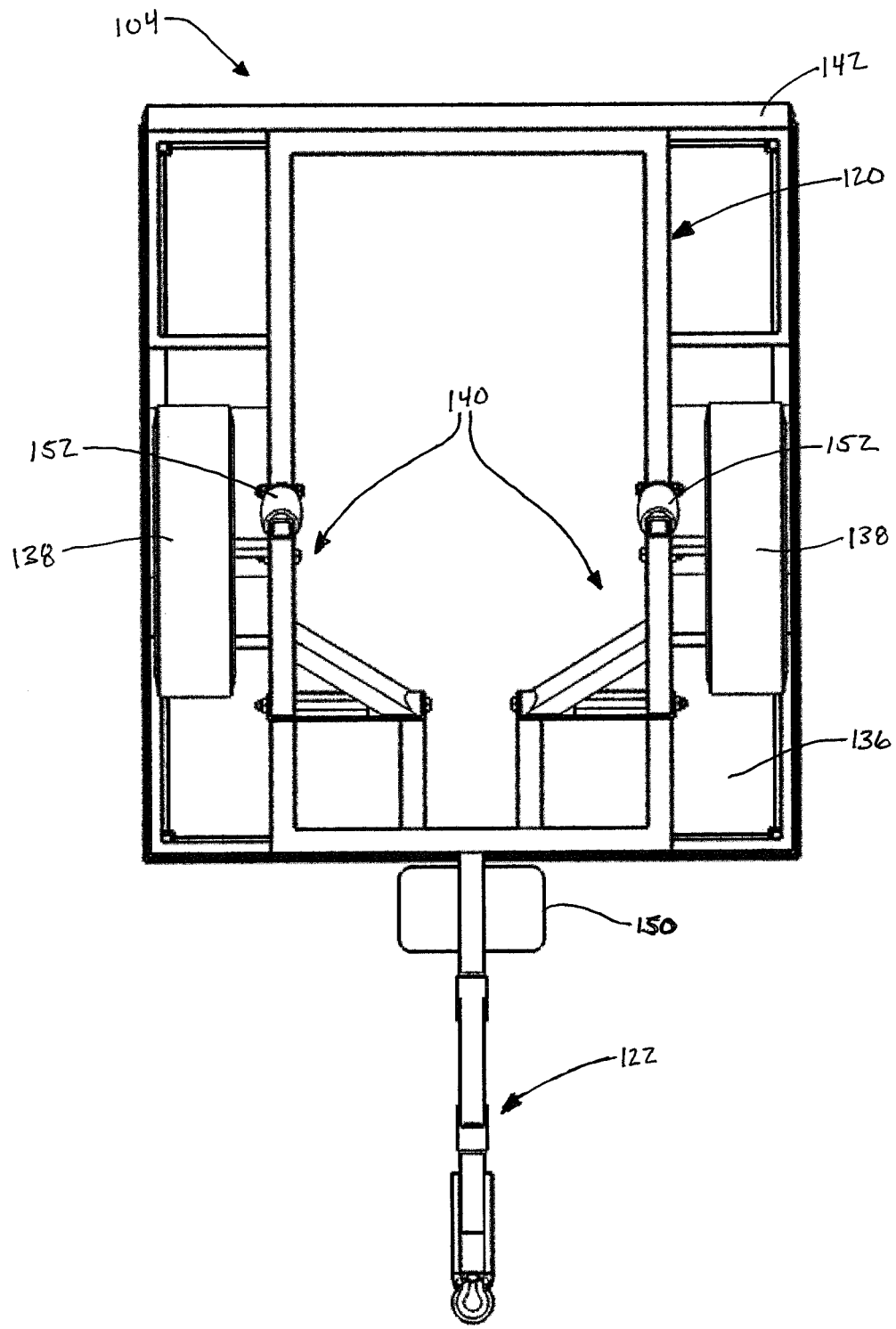
FIG. 5 is a bottom plan view of the tow-behind trailer of the off-roading system of FIGS. 1A and 1B, according to an embodiment of the present disclosure.
Figure 6:
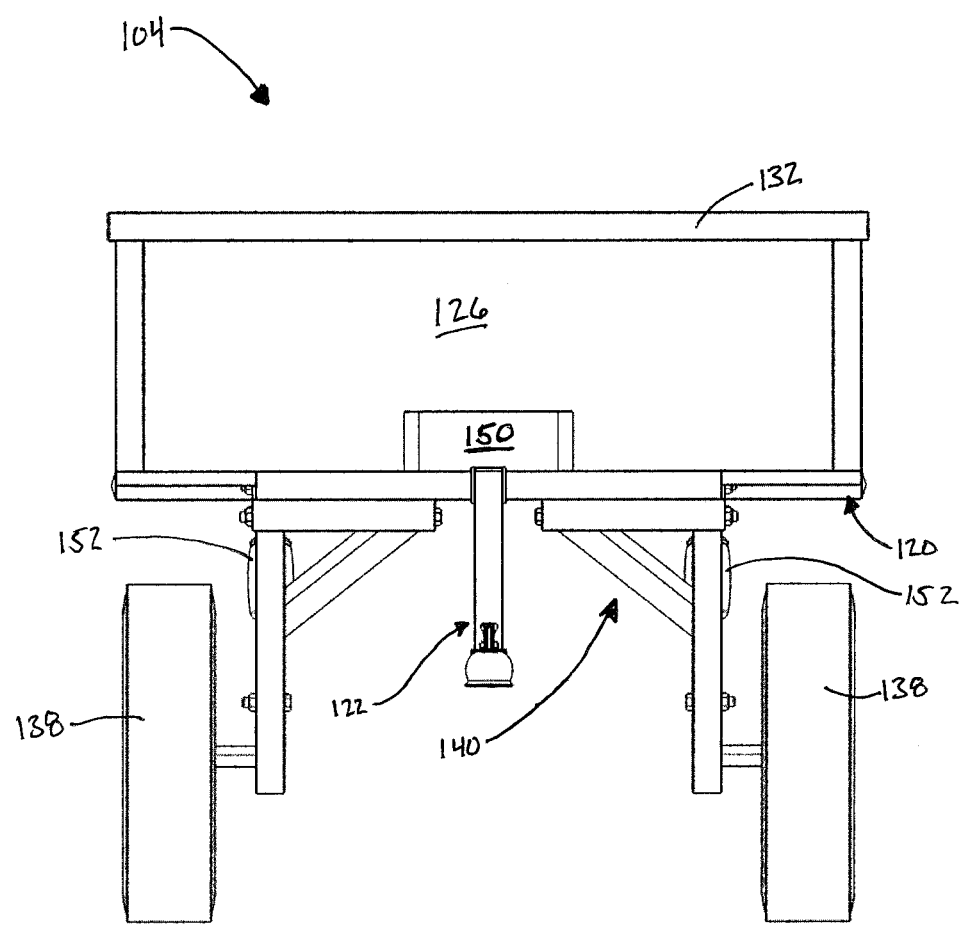
FIG. 6 is a front view of the tow-behind trailer of the off-roading system of FIGS. 1A and 1B, according to an embodiment of the present disclosure.

An additional component 148 is also shown in FIG. 3B as being within the trailer 134. The component 148 may represent any number of different systems or components. For instance, the component 148 may include an air compressor and associated plumbing. The air compressor could, for instance, be used to provide air to shock absorbers 152 (see FIGS. 4-6). In such an embodiment, plumbing may connect directly to the shock absorbers 152. Providing air may be used to change the stiffness or even the length of the shock absorbers 152 and associated suspension members. In other embodiments, a compressor may include a hose that may be used for other purposes, including for supplying air to the tires 138, for blowing the interior of the trailer 104 (e.g., to clean out dust), or for other purposes. In other embodiments, the component 148 may include additional or other features. For instance, a battery, generator, or other power source may be provided to power the compressor or other components (e.g., an on-board electric braking system). Optionally, power output (e.g., 110V outlets) may be provided to supply external devices.

FIG. 3B also illustrates another additional component attached to the tongue 122. In this particular embodiment, the component may include a tray 150. The tray 150 may be used to provide some storage capacity outside the interior of the trailer 104. For instance, the tray 150 may be sized to receive a fuel container. When used with a fuel container, a user may have convenient and easy access to additional fuel for a hauling vehicle. Of course, the tray 150 may also be used to carry multiple fuel containers (e.g., two standard-sized containers), or other components (e.g., a jack, tool box, winch, stove, etc.).

Figure 7:
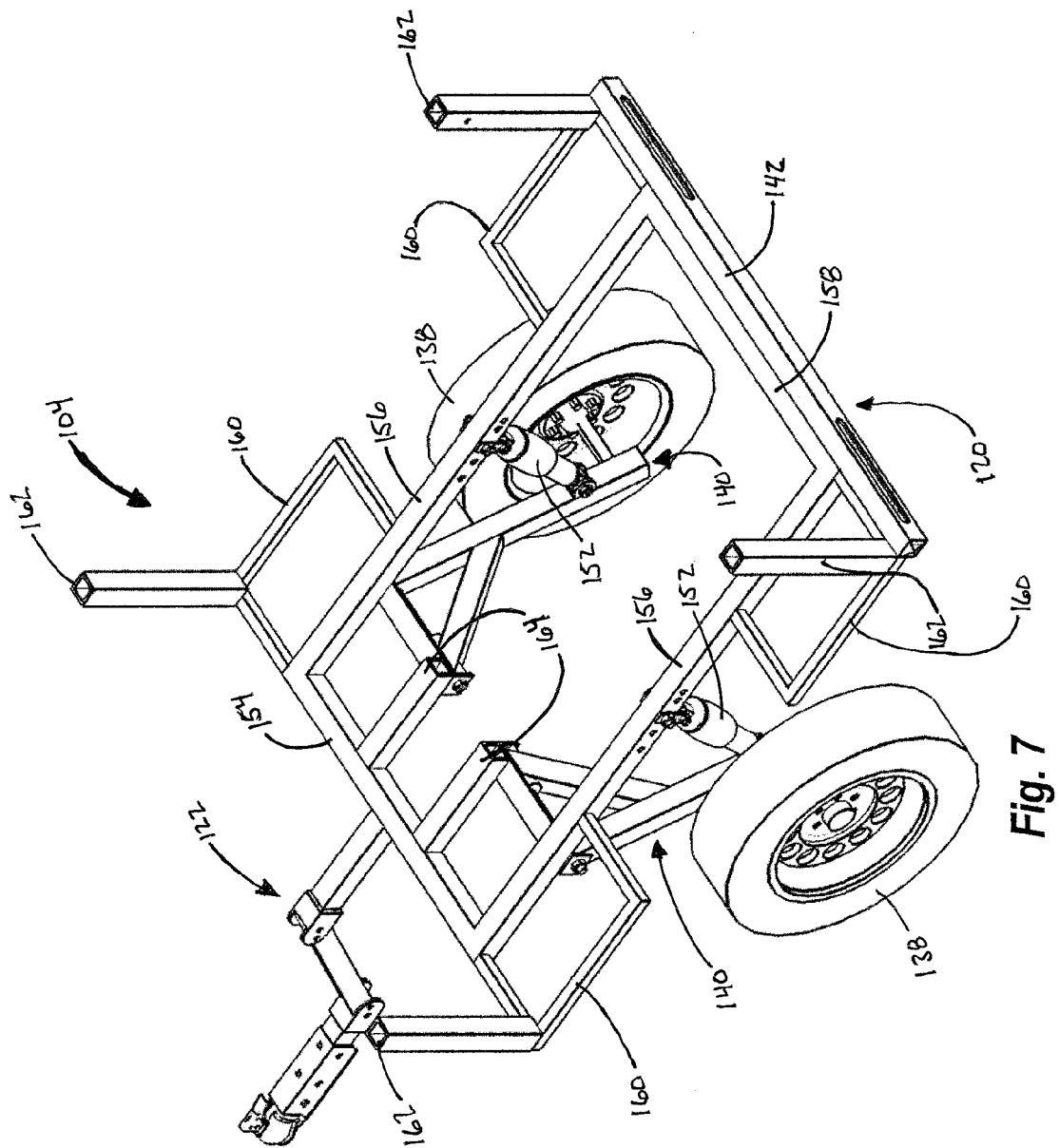
FIG. 7 is a perspective view of a frame of the tow-behind trailer of the off-roading system of FIGS. 1A and 1B, according to an embodiment of the present disclosure.
Figure 8:
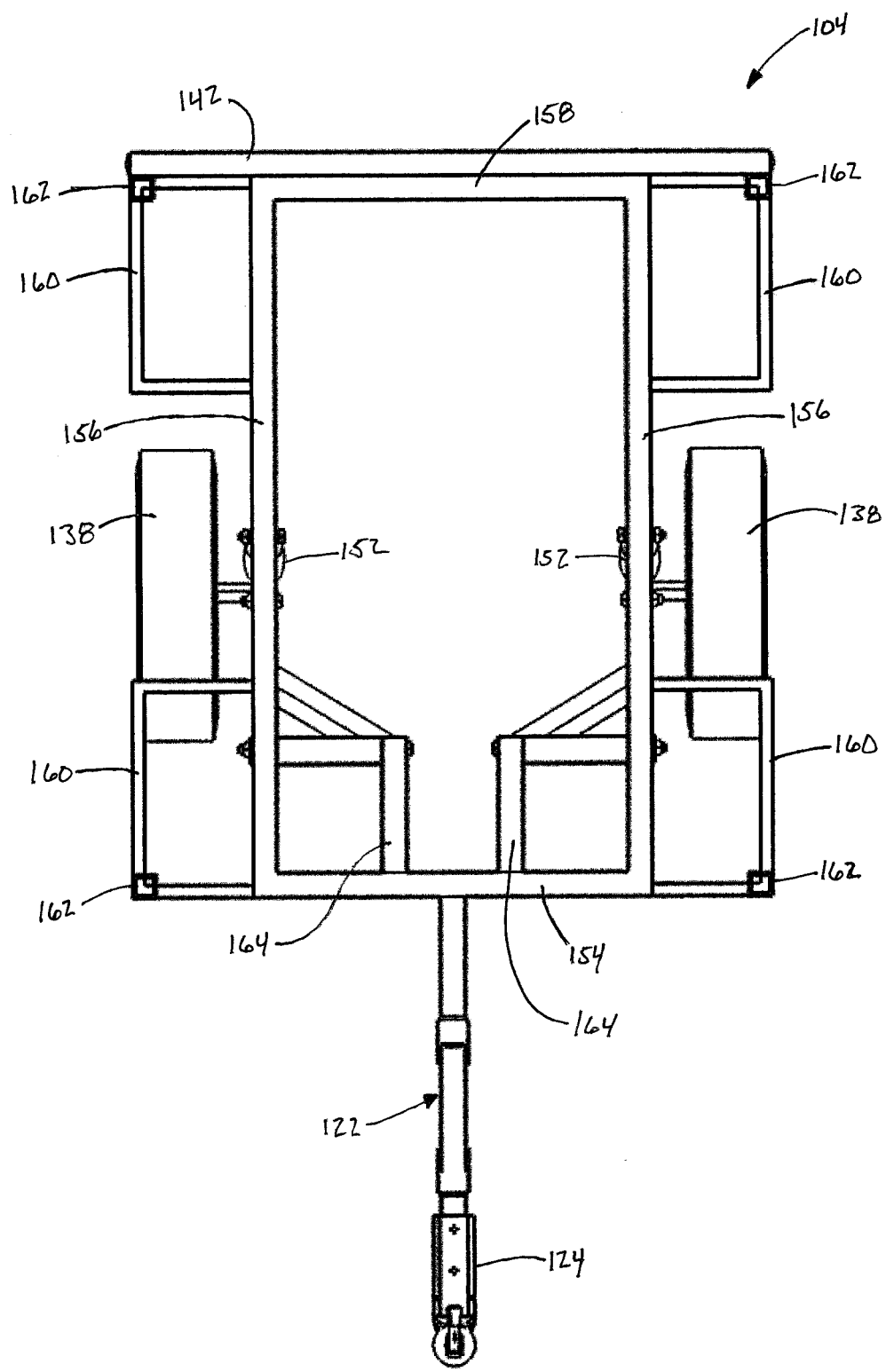
FIG. 8 is a top plan view of the frame of the tow-behind trailer of FIG. 7, according to an embodiment of the present disclosure.
Figure 11:
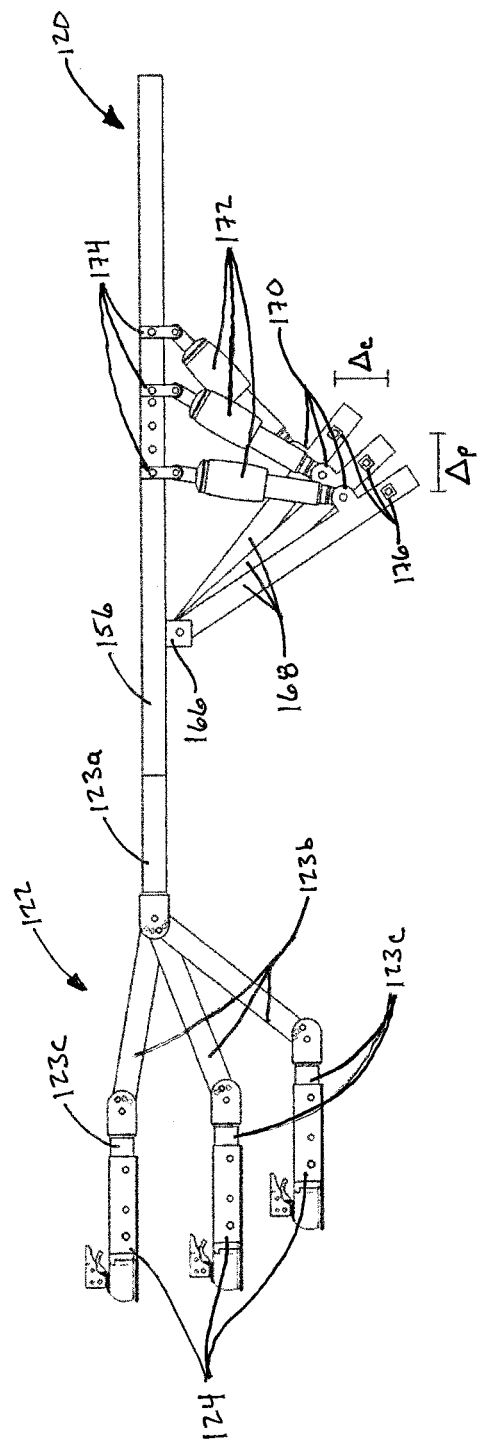
FIG. 11 is a side view of the suspension and hitching systems of FIG. 9, the suspension and hitching systems being adjustable, according to an embodiment of the present disclosure.

With reference now to FIGS. 7-11, additional aspects of some embodiments of the present disclosure. In particular, FIGS. 7 and 8 illustrate respective perspective and top views of a frame 120 of an example trailer 104. FIGS. 9-11 illustrate side views of an example adjustable suspension system 140 and tongue 122.

The frame 120 shown in FIGS. 7 and 8 may generally define the shape and/or size of an enclosure or container for storing or transporting objects. The size of the frame 120 may be fully customized to suit a particular application. For instance, in some embodiments it may be desirable that the width of the trailer 104 not exceed, or only marginally exceed, the width of a towing vehicle. Accordingly, if the towing vehicle is about four feet wide, the frame 120 of the trailer 104 may also be up to about four feet wide. Of course, the frame 120 may also be wider if the width is less of a concern and/or if the towing vehicle is larger. Further, as discussed herein, a shorter trailer 104 may be used to provide a larger approach angle for off-road applications. In such an embodiment, the length of the enclosure of the trailer 104 may be suitable for such off-road applications, and can be up to about five feet in some embodiments. In other embodiments, the frame 120 may define an enclosure which is longer or shorter than about five feet. For instance, the enclosure may be up to about three feet, up to about seven feet, or longer than about seven feet or shorter than about three feet.

In this particular embodiment, various support and reinforcement members may be used to define the frame 120. For instance, the tongue 122 may be connected to a front frame member 154 which may extend generally in a horizontal direction across a full or partial width of the trailer 104. Two or more lengthwise frame members 156 may be secured to the front frame member 154, and can run the full or partial length of the trailer 104. In this particular embodiment, for instance, the lengthwise frame members 156 may run about a full length between the front frame member 154 and a rear frame member 158. The rear frame member 158 may be connected to the bumper 142 in some embodiments.

As shown in FIGS. 7 and 8, the frame members 154-158 may be spaced apart to generally define a rectangularly or other shaped support for a floor of the trailer 104. In this particular embodiment, the trailer 104 may be wider than the frame members 154-158. In particular, the illustrated frame 120 may include additional frame members 160 at each lateral corner of the rectangle defined by frame members 154-158, which frame members 160 may form rectangular supports that extend the width of the trailer 140. In this embodiment, longitudinal space may be sufficient for a wheel well to be located therein, although in other embodiments a space may have other purposes or be omitted entirely. Indeed, in some embodiments, the frame members 154-158 may substantially define the outer peripheral size of the trailer 104.

As discussed herein, the trailer 104 may define an enclosure for storing or containing various items. To contain the items, the trailer 104 may have a height. The height may, as shown in FIG. 7, be defined by one or more vertical frame members 162. In this particular embodiment, the vertical frame members 162 are located at the outer, peripheral corners of the frame 120. More specifically, the frame members 162 may extend vertically from the corners of the rectangular frame members 120. The length of the vertical frame members 162 may vary as desired to increase or decrease the depth of an enclosure of the trailer 104. In some embodiments, the length of the vertical frame members 162 is between about twelve and about thirty-six inches, although in other embodiments the vertical frame members 162 may be longer or shorter.

The frame 120 may also include additional components for defining a shape or size of the trailer 102 and/or for reinforcing the trailer 104 or components thereof. FIGS. 7 and 8 illustrate, for instance, two additional reinforcement members 164 extending rearwardly from the interior side of the front frame member 154. The reinforcement members 164 may have any number of purposes. In this particular embodiment, for instance, the reinforcement members 164 may support the suspension system 140. Of course, in other embodiments, the same or other reinforcement members 164 may reinforce a floor or side of the frame 120, or have other reinforcement purposes.

The trailer frame 120 may be constructed and assembled in any number of manners. For instance, some or all of the various frame members 154-164 may be welded, bolted, or otherwise attached in a spaced-apart relationship with respect to each other. The frame members 154 and 158 may generally be about perpendicular to frame members 156 and 164, although such an embodiment is merely illustrative. Additionally, the vertical frame members 162 may be about perpendicular to the frame members 160, but in other embodiments may extend at other angles, and need not be perfectly vertical.

The frame members 154-164 may also be formed of any suitable material. In one embodiment, for instance, the frame members 154-164 may be formed of steel channel or tubing materials. In other embodiments, however, aluminum, composites, organic materials (e.g., wood), polymeric materials, or other materials may be used. In the illustrated embodiment, the frame members 154-158, 162, and 164 may be formed of 2×2" square tubing, while the frame members 160 are formed of 1×1" tubing. Of course, the frame members 154-164 may be formed of other materials or support elements of different sizes, shapes, and configurations.

As discussed herein, one aspect of the present disclosure may include a trailer that includes a suspension system 140 and/or tongue 122 which can be adjusted to accommodate different types of loading, terrain, and activities. In some embodiments, the suspension system 140 may, for instance, be adjusted to change a clearance of the trailer. In the same or other embodiments, the position of the wheels relative to a length of the trailer may be altered. In still other embodiments, which may or may not be combined with other embodiments that adjust the suspension system, the drop and/or length of the tongue may be adjusted.

FIG. 9 illustrates a side view of an example adjustable suspension system 140 and adjustable tongue 140. In this particular embodiment, the suspension system 140 may connect to a frame 120 of a trailer. More particularly, this embodiment illustrates the frame 120 as including a lengthwise support member 156 intended to run along all or a portion of the length of the length from the front to back of the trailer. The suspension system 140 may be adjustable so that some or all components may move along the length of the support member 156.

More particularly, the support member 156 may include, or attach to, a pivot 166. In this particular embodiment, the pivot 166 may be included on a bracket attached to the support member 156, which bracket may extend downwardly from the support member 156. In other embodiments, however, the pivot 166 may be located directly on the support member 156, extend upwardly or laterally therefrom, or be otherwise positioned or located. In some embodiments, the pivot 166 may be fixed, while in other embodiments the pivot 166 may be moveable.

A trailing suspension arm 168 may be pivotally secured to the pivot 166. The suspension arm 168 may be configured to rotate about the pivot 166. To facilitate such movement, a bolt or rod may extend through the suspension arm 168 and pivot point 166. Optionally, one or more bushings, bearings, or other components may be used to facilitate rotation of the suspension arm 168 about the pivot 166.

The suspension arm 168 is connected to the pivot 166 at or proximate a top end of the suspension arm 168. Toward or proximate the lower end of the suspension arm 168 there may be an additional pivot 170. The pivot 170 may also include bushings, bearings, or other suitable components. Such components may facilitate a connection at the pivot 170 to a lower end of a shock absorber 172.

The shock absorber 172 may also be configured to have the upper end thereof attached to the frame 120. As shown in FIG. 9, for instance, the shock absorber 172 may attach to a pivot 174 which may, in turn, connect to the lengthwise support member 156. In the embodiment shown in FIGS. 9 and 10, the pivot 174 may be moveable relative to the support member 156. For instance, the support member 156 may include tubing, while the pivot 174 may include a U-shaped or other component having an interior channel. The interior channel may be sized to receive the support member 156 and slide therealong. One or more bolts, rods, or other member may be used to secure the various components at the pivots 166, 170, 174. Additionally, as best shown in FIG. 10, the pivot 174 may also include an opening, which opening can align with any of various openings 176 formed along the length of the support member 156. A bolt, rod, or other similar component may be used to secure the pivot 174 at a particular location by extending through a particular one of the openings 176 and the opening in the pivot 174. If the bolt, rod, or other securement device is removed, the pivot 174 can be slid along the length of the support member 156 and potentially thereafter secured at a different location corresponding to a different one of the openings 176. When the pivot 174 is moved longitudinally along the support member 156, the pivots 166, 170 may remain connected. Where the pivot 166 is fixed in place, the distance between the pivots 166 and 174 may change by virtue of sliding the pivot 174. In such an embodiment, the shock absorber 172 and suspension arm 166 may act as linkages that pivot about pivots 170 and 166, respectively.

As further shown in FIGS. 9 and 10, a spindle 176 may also be connected to the suspension arm 168. In general, the spindle 176 may be bolted, welded, or otherwise secured in place. In one embodiment, the spindle 176 is configured to connect to an axle and/or hub. Such axle or hub may then connect to a trailer wheel. Thus, the trailer wheel can be secured to the suspension arm 168. Consequently, as the shock absorber 174 moves (e.g., by sliding the pivot 174 along the support member 156), the position of the trailer wheel may change relative to the shock absorber 172, frame 120, and the like.

A more particular example of the potential effects of adjustment of the longitudinal position of the pivot 174 on a trailer may be better understood in the context of FIG. 11. In particular, FIG. 11 illustrates the pivot 174 at each of three different positions (e.g., corresponding to different holes drilled or otherwise formed in the support member 156). As shown in FIG. 11, when the pivot 174 moves from left to right in the illustrated orientation, an angle between the suspension arm 168 and the support member 156 may decrease, while an angle between the suspension arm 168 and the shock absorber 172 about the pivot 170 may increase. The spindle 176 may therefore also move. In FIG. 11, the spindle 176 may move in both longitudinal and vertical directions. For instance, the change in longitudinal position is represented by the distance $\Delta_P$ while the change in vertical position is represented by the distance $\Delta_C$.

The distances $\Delta_C$ and $\Delta_P$ may also represent changes to the position of a wheel relative to the frame 120. For instance, because the wheel may be connected to the spindle 176, when the shock absorber 172 moves from the illustrated left-most position to the right-most position, the spindle 176 may move rightward and upward. Consequently, the distance between the wheel and the frame 120 may be decreased, also resulting in a decreased clearance. The longitudinal position of the wheelbase may also change and may move further from the tongue 122. Of course, moving the pivot 174 from the right to the left in the illustrated orientation may have the opposite effect of increasing clearance and/or moving the wheelbase toward the tongue 122.

The amount of change in height and/or longitudinal position that occurs by sliding or otherwise moving the pivot 174 along the support member 156 can vary based on the distance traveled. In FIG. 11, for instance, there are six different locations where the pivot 174 may be located. The spacing between the locations may be varied. In FIG. 11, for instance, the spacing between some openings 176 may be about equal, whereas spacing between other openings 176 may be different. In particular, each of the left-most four openings 176 may have about equal spacings (e.g., about two inches). The fifth opening may, however have a reduced distance (e.g., about one inch). The sixth opening may then have an increased distance (e.g., about five inches). The illustrates spacing of the openings 176 is, however, merely illustrative. Any number of openings may be provided, the spacing between any or all of the openings may be varied, and the total distance along the support member 156 at which the openings 176 are located may vary. Moreover, while pivot 166 is shown as fixed and pivot 174 is shown as movable, in other embodiments the relationship may be reversed, or both pivots 166, 174 may be adjustable or fixed, as desired.

Returning briefly to FIGS. 9 and 10, a tongue 122 is also shown in additional detail as being connected to a frame 120, and extending forwardly therefrom. In the illustrated embodiment, the tongue 122 may be formed from multiple components, and may drop downward and/or be adjustable. In particular, FIG. 10 illustrates the tongue 122 in a disassembled manner.

In this particular embodiment, an upper section 123*a* of the tongue 122 may connect to the frame 120 and extend about perpendicularly therefrom. At a front end of the upper section 123, there may be a pivot 125*a* configured to connect to an intermediate section 123*b* of the tongue 122. The pivot 125*a* may include two openings in this embodiment. A first, central opening may be used to receive a pivot bolt, rod, or other similar component. The pivot bolt or rod may extend through the central opening and a similar central opening in the rear-most end of the intermediate section 123*b*. One or more additional holes or openings may be formed more forwardly on the intermediate section 123*b*. An additional bolt or rod may pass through the second opening in the pivot 125*a* and through one of the openings in the intermediate section 123*b*. The second bolt, rod, or the like may act as a locking member to lock the intermediate section 123*b* at a fixed orientation relative to the upper section 123*a*. The angle of the intermediate section 123*b* relative to the upper section 123*a* may vary based on which opening in the intermediate section 123*b* receives the locking member.

The lower section 123c of the tongue 122 may be constructed similarly relative to the upper section 123a. In this particular embodiment, a lower pivot 125b is located at the rearward end of the lower section 123c, and can receive the lower end of the intermediate section 123b. A pivot bolt, pin, rod, or the like may be used to secure the intermediate and lower sections 123b, 123c together, while a locking bolt, pin, rod, or the like may fix them at a particular orientation.

The illustrated embodiment is merely illustrative, and the tongue 122 may be adjustable in other manners. For instance, the pivots 125a, 125b could be just as easily located on the intermediate section 123b rather than on the upper and lower sections 123a, 123c. Further, while the intermediate section 123b is shown as having three possible locations for the locking pin, rod, bolt, or the like, there may be only a single location, two locations, or more than three locations. For instance, five locations may be provided. Optionally, the different locations for the locking mechanism may allow a wide range of angles to be obtained with the tongue 122. In one embodiment, for instance, the intermediate section 123b of the tongue 122 may adjust from a range of about forty-five degrees relative to the upper section 123a, to about zero degrees. In other embodiments, the range may vary, and the angles may be less than zero degrees (e.g., by rising upward) or greater than forty-five degrees.

For instance, FIG. 11 illustrates a tongue 122 that may be located at any of three different positions relative to the frame 120. In this particular embodiment, the intermediate section 123b may extend at an angle up to about fifty degrees from the upper section 123a, to an angle of negative ten degrees. Further, as the tongue 122 is adjusted, FIG. 11 illustrates an example in which the extension of the tongue 122 from the frame 120 may increase or decrease. Of course, such an embodiment is merely illustrative and may be varied as desired. Indeed, rather than providing discrete positions, some embodiments contemplate sliding within a channel so that angle can be adjusted in very small, and potentially infinitely small, increments. A similar system may also be used for adjusting the pivot 174 of the suspension system 140.

The suspension system 140 and tongue 122 may thus be adjustable, although the particular adjustment mechanism may be varied in any number of manners. Moreover, with any such adjustment the clearance and/or wheelbase position may change as may the approach angles of the corresponding trailer.

Figure 12A:
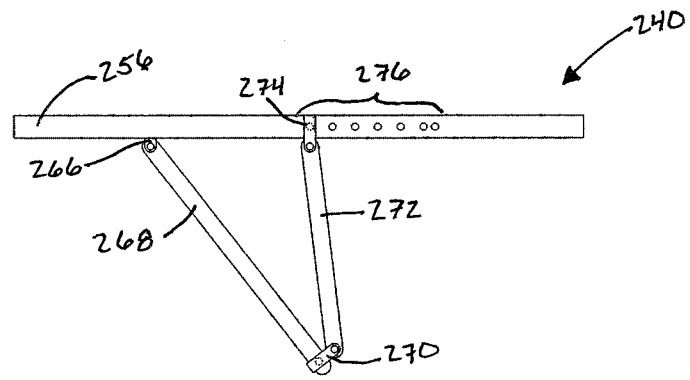
FIGS. 12A-12H schematically illustrate various positions of an adjustable suspension system according to some embodiments of the present disclosure, the suspension system being adjustable to change a height and/or clearance of an associated trailer, according to an embodiment of the present disclosure.

Turning now to FIGS. 12A-12H, a suspension system 240 is schematically illustrated to further show the effects of adjusting the position of one or more suspension system components 240. In particular, FIG. 12A illustrates the suspension system 240 in a first position in which a suspension arm 268. A shock absorber 272 is shown as a fixed link, but it should be appreciated that the shock absorber 272 may include any number of suitable components, including mechanical springs, gas springs, pneumatic cylinders, hydraulic cylinders, or the like.

As shown in FIG. 12A, the suspension arm 268 is fixed to a support member 256 at a pivot 266, and to the shock absorber 272 at a second pivot 270. The shock absorber 272 is then, in turn, connected to an additional pivot 274, which is secured at a left-most position on the support member 256.

Figure 12B:
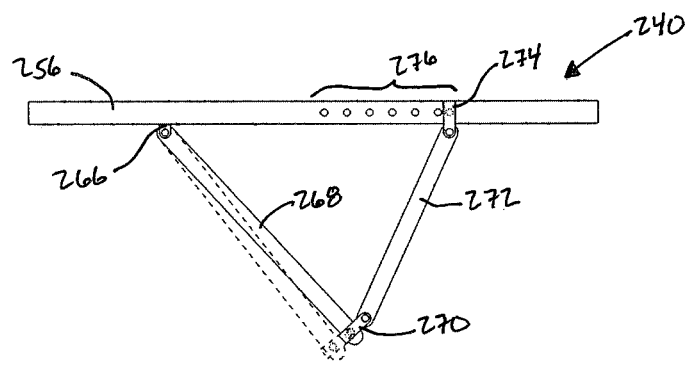

As discussed herein, the pivot 274 may potentially change. As shown in FIG. 12B, for instance, there are seven potential positions (corresponding to openings 276) on the support member 256. If moved to the right-most position, the pivot 274 may also cause the top end of the shock absorber 272 to move rightward. Such movement causes the suspension arm 268 to pivot about the pivot 266, and the angle between the suspension arm 268 and the shock absorber 272 increases at the pivot 270. From the phantom lines illustrating the original position corresponding to FIG. 12A, it can be seen that such movement can cause the lower end of the suspension arm 268, and thus a connected wheel, to move rightward and upward (i.e., reducing height or clearance of a connected moving system). Of course, an opposite movement could cause a leftward movement that could also be downward to increase clearance.

Figure 12C:
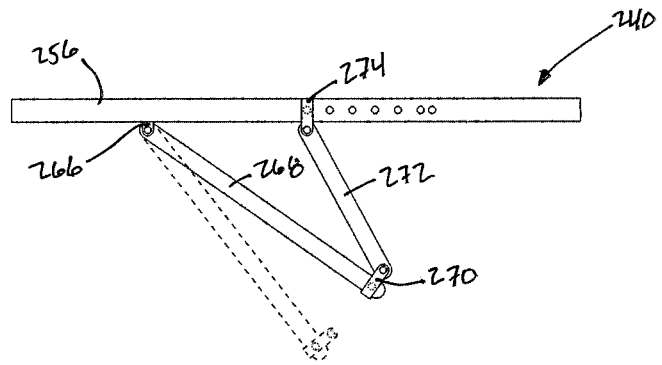

In some embodiments, adjusting the suspension system 240 may be made by using any of one or more components, which components can potentially be used collectively or individually. For instance, as discussed herein, the shock absorber 272 may be adjustable. Air, gas, oil, or the like may, for instance, be provided or released to stiffen or relax the shock absorber 272. In some embodiments, adjustments to the shock absorber 272 may increase or decrease the length of the shock absorber. FIG. 12C shows an example in which the shock absorber 272 has been decreased relative to that shown in FIG. 12A. As also shown relative to the original position in phantom lines, changing the length of the shock absorber can also change the position of the suspension arm 268 to move a wheelbase and/or change a height/clearance of a connected vehicle.

Figure 12D:
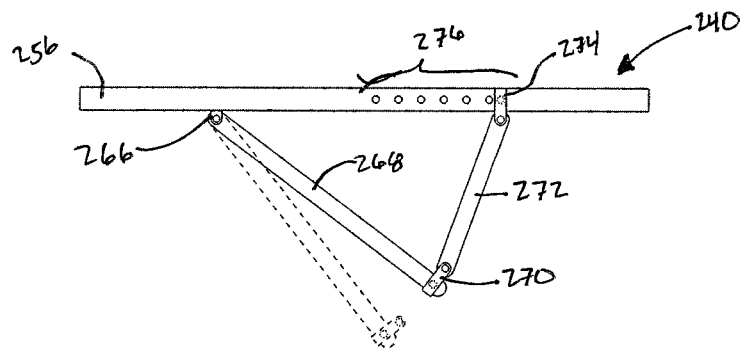

FIG. 12C shows a change in position of the suspension system 240 without a corresponding change to the position of the pivot 274. In some embodiments, changing the position of the pivot 274 and the length of the shock absorber 272 may be performed collectively. FIG. 12D, for instance, illustrates that when both the pivot 274 and shock absorber 272 are adjusted, the position of the wheelbase (e.g., a lower position of the suspension arm 268), may also move longitudinally and vertically.

Figure 12E:
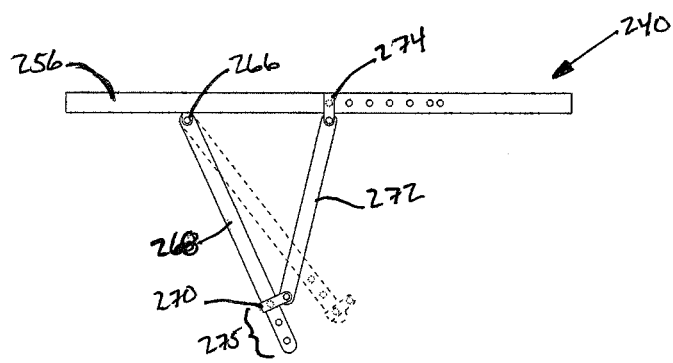

Adjustments to the position of the wheelbase, and thus the clearance of a corresponding vehicle such as a trailer, may also be made in other manners. FIG. 12E, for instance, illustrates an example embodiment in which the pivot 270 may be movable rather than fixed. In such an embodiment, the pivot 270 may move relative to the suspension arm 266 (e.g., to any of positions 275). When such movement occurs, the position of the shock absorber 272 may change relative to the suspension arm. In such an embodiment, the suspension arm 268 may also then move, causing an attached wheel to change longitudinal position and/or vertical distance relative to the support member 256 of a corresponding frame.

Figure 12F:
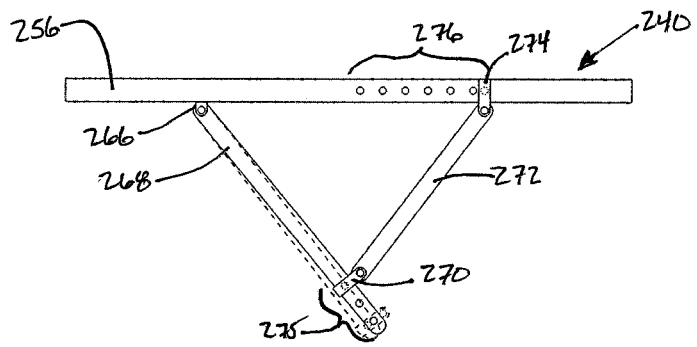

Of course, the pivot 270 may be moved together with the pivot 274 of, as shown in FIG. 12F. In this particular example, movement of the pivot 274 from left-most to right-most positions 276, along with movement of the pivot 270 from bottom-most to top-most positions 275 may create a minor change in wheel position relative to the support member 256.

Figure 12G:
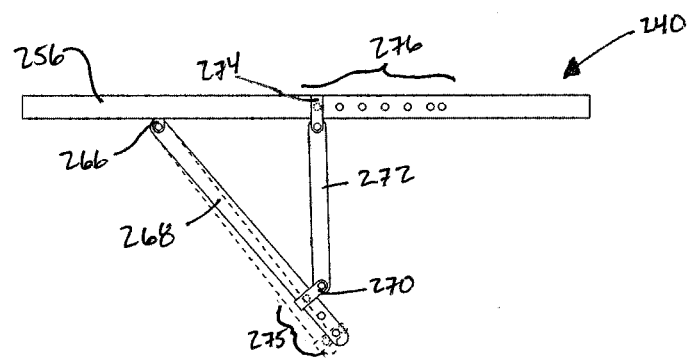
Figure 12H:
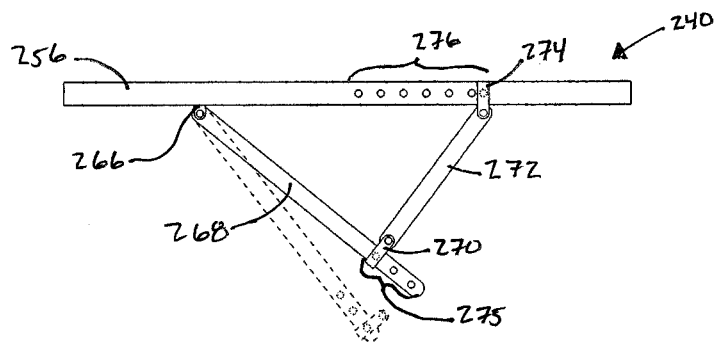

Naturally, changing the location of the pivot 270 may also be combined with other adjustment mechanisms. FIG. 12G, for instance, illustrates an embodiment in which the length of the shock absorber 272 is adjusted together with the position of the pivot 270. FIG. 12H illustrates an example embodiment in which adjustment can collectively be performed by moving the pivot 274, moving the pivot 270, and changing the length of the shock absorber 272.

Figure 13:
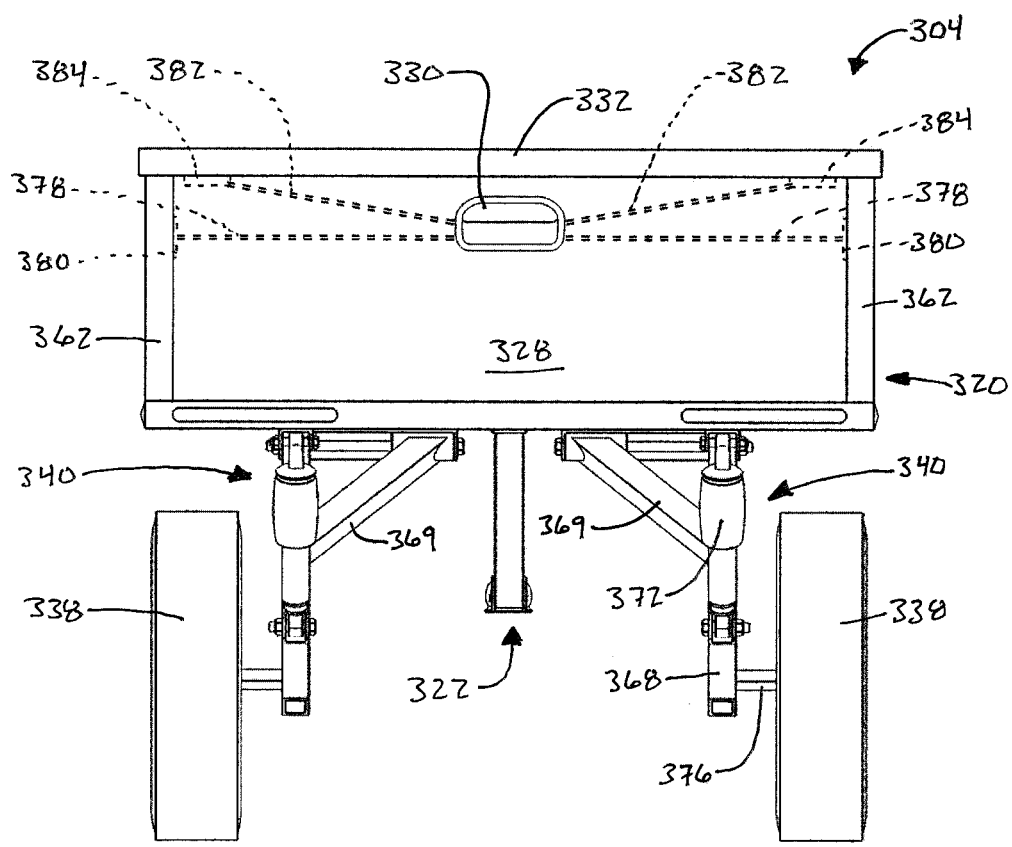
FIG. 13 illustrates a rear view of an example tow-behind trailer having a tailgate and a top cover, the tow-behind trailer including a handle for collectively releasing the top cover and tailgate, according to an embodiment of the present disclosure.

Embodiments of the present disclosure may include still additional features and components. With reference now to FIG. 13, for instance, a trailer 304 is shown in additional detail, and includes a suspension system 340, attached to a set of wheels 338 (e.g., via a spindle 376). The suspension system 340 may be adjustable in any suitable manner, including as disclosed herein.

In this particular embodiment, a trailing suspension arm 368 may include a fixed length linkage connected to the spindle 376 and a frame 320. The connection to the frame 320 may be made via a pivot to allow the suspension arm 368 to rotate relative to the frame 320. In some embodiments, the suspension arm 368 may also include reinforcement members, such as support 369. In this embodiment, the support 369 may extend at an angle relative to the suspension arm 368 and also connect to an elongated pivot (see also FIGS. 4, 5 and 8). When the suspension system 340 is used to rotate the suspension arm 368 about the pivot, both the suspension arm 368 and the support 368 may potentially rotate. In some embodiments, the pivot may be secured and reinforced using multiple segments of the frame 320 (see FIG. 8) so as to allow and/or reinforce an elongated pivot.

FIG. 13 also illustrates an example embodiment in which the frame 320 is connected to a tailgate 328, top cover 332, and a tongue 322. In accordance with some embodiments, the tailgate 328 and top cover 322 may each be opened to access the interior of the trailer 304. A handle 330 may be provided to facilitate such access. In particular, by moving the handle (e.g., pulling the handle upward), the top cover 332 and tailgate 328 may be released. More particularly still, the tailgate 328 may be released from the upright frame components 362 using a latch system, while the top cover 332 may also use a latch system to be released from the frame components 362 and/or from the tailgate 328.

In some embodiments, the latch system for releasing the tailgate 328 may be a generally conventional system. For instance, a set of rods 378 may connect to the handle 330 via a latch system. When the handle 330 is pulled, the rods 378 may be retracted. Latch assemblies 380 at the opposing ends of the rods 378 may be pulled as the rods 378 are retracted, causing the latch assemblies 380 to be released from bolts, latches, posts, hooks, or the like within the upright frame components 362.

In accordance with at least one embodiment of the present disclosure, the handle may also be connected to an assembly for releasing the top cover 332. In FIG. 10, the handle 330 is shown as being linked to a set of rods 382 that extend to corresponding latch assemblies 384. Upon pulling on the handle 330, the rods 382 may therefore cause the latch assemblies 384 to release from mating components within the top cover 332.

Figure 14A:
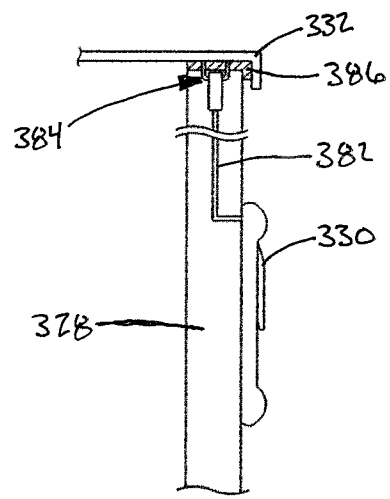
FIGS. 14A-14C schematically illustrate an example tailgate and top cover of a trailer, the handle being used to release each of the tailgate and top cover, according to an embodiment of the present disclosure.
Figure 14B:
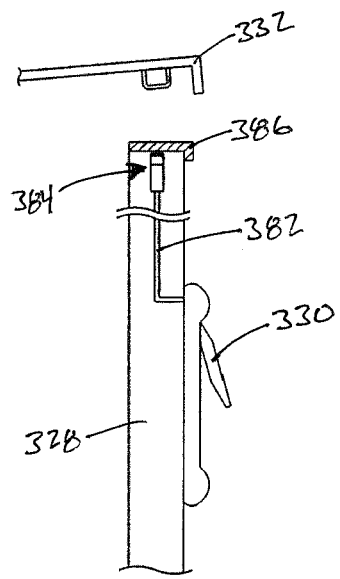
Figure 14C:
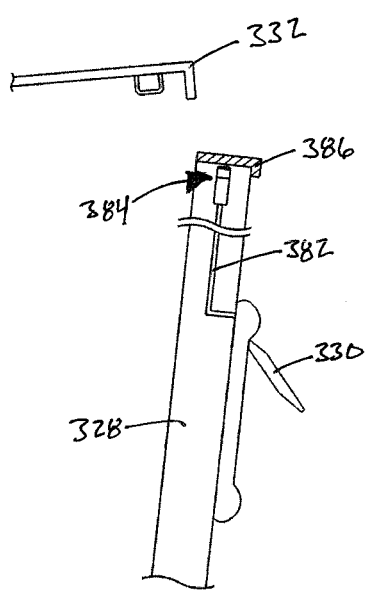

In some embodiments, the rods 378, 382 and/or latch assemblies 380, 384 may operate synchronously so that the top cover 330 may be released at the same time as the tailgate 328. In other embodiments, however, the rods 378, 382 and/or latch assemblies 380, 384 may be structured differently so as to release at different times. FIGS. 14A-14C illustrate an example system in which the top cover 332 may be released prior to release of the tailgate 328.

In particular, FIG. 14A illustrates an example tailgate 328 with a top cover 332 extending thereon. In this particular embodiment, the top cover 332 may overlap the tailgate 328 to provide a weather-tight seal. Optionally, a gasket 386 or other weather-proofing agent may be provided to form a seal between the tailgate 328 (and optionally a frame and/or sidewalls) and the top cover 332.

The handle 330 may be connected to a rod 382 that is configured to be retracted upon pulling of the handle 330. For instance, a cam assembly internal to the handle 330 may be used to retract the rod 382. The rod 382 may in turn connect to a latch assembly 384 that secures to a corresponding structure of the top cover 332 to hold the top cover 332 in place relative to the tailgate 328.

As shown in FIG. 14B, when the handle is pulled, the rod 382 may be retracted, which can cause the latch assembly 384 to release. In turn, the top cover 332 may be allowed to be removed from the tailgate 328 and opened. In some embodiments, the rod 382 may retract more rapidly than a corresponding rod of the tailgate release mechanism, thereby allowing less than full movement of the handle 330 to cause release of the top cover 332. Thereafter, if the handle 330 continues to be pulled, as shown in FIG. 14C, the tailgate release mechanism may activate to allow the tailgate 328 to be dropped down. Accordingly, the single handle 330 may be provided with a two-step operation where partial movement may release the top cover 332, and full movement may release the tailgate 328.

As discussed herein, an example trailer may attach to a towing vehicle using any suitable hitching system. The hitching system may include a ball and coupler as discussed herein, but such a hitch is merely illustrative. FIGS. 15A-15I, for instance, illustrate another example embodiment of a suitable hitching system 406 that may be used in some embodiments of the present disclosure.

Figure 15A:
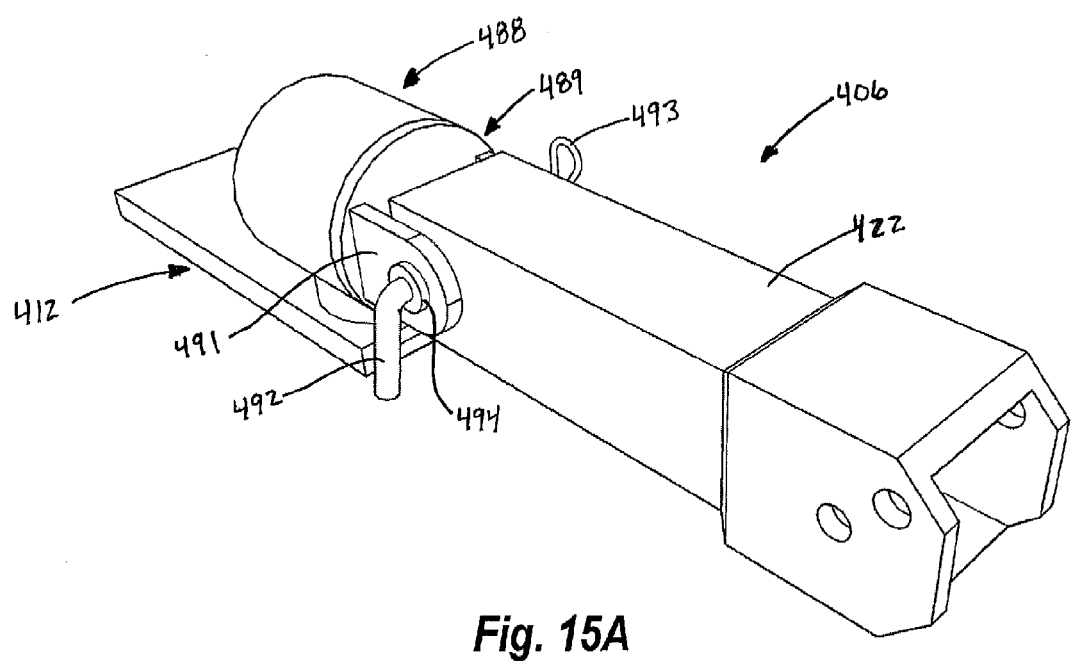
FIG. 15A is a perspective view of an example hitch for use in towing a trailer, according to an embodiment of the present disclosure.
Figure 15B:
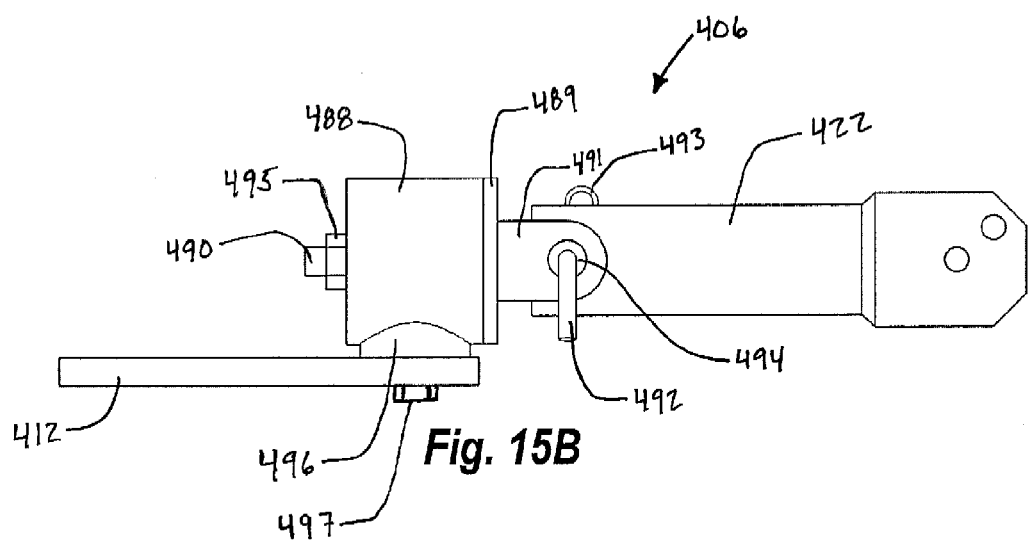
FIG. 15B is a side view of the example hitch of FIG. 15A, according to an example embodiment of the present disclosure.
Figure 15C:
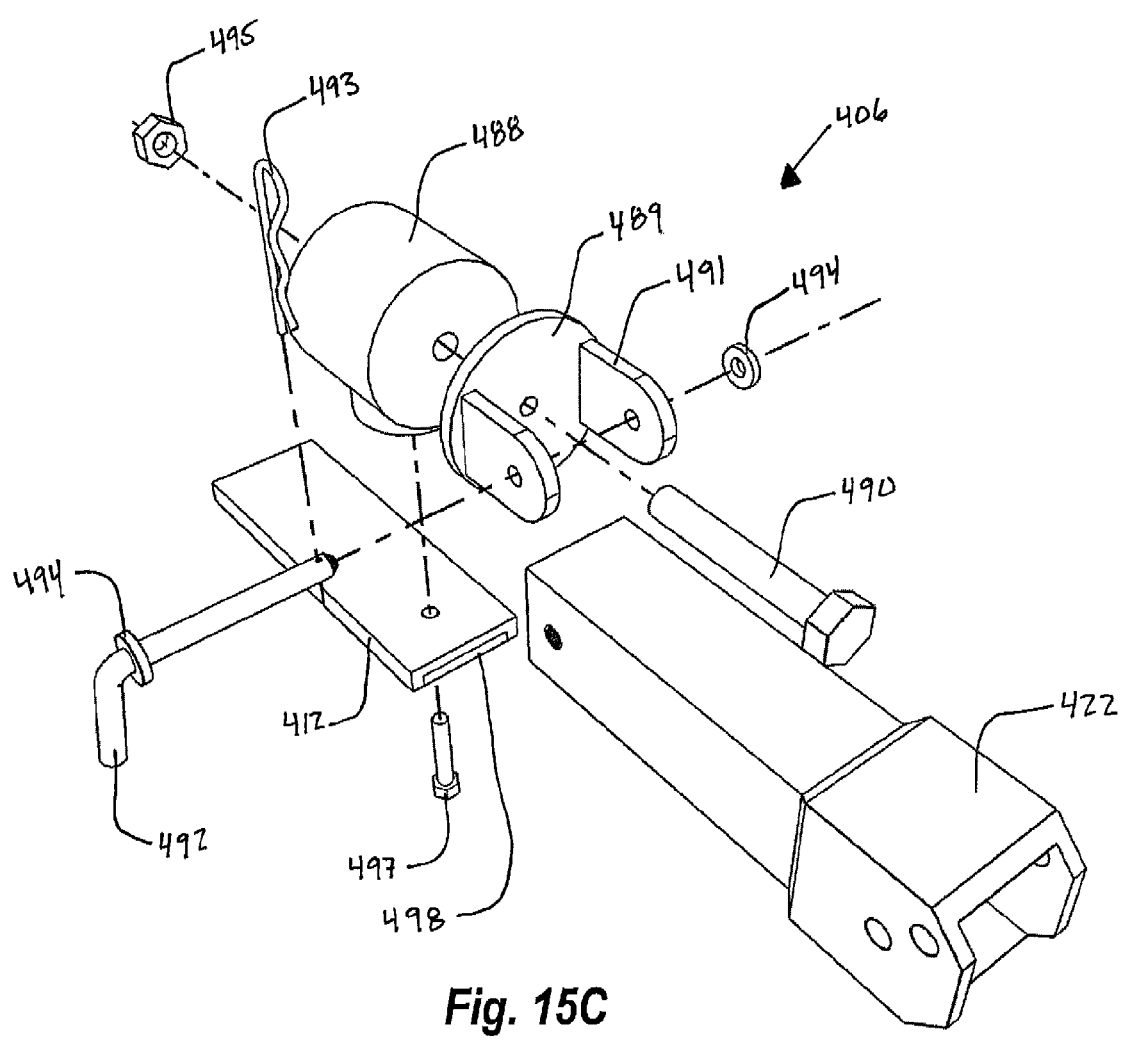
FIG. 15C is an exploded view of the example hitch of FIGS. 15A and 15B.

In particular, as best shown in FIGS. 15A-15C, a portion of a tongue 422 may be coupled to a hitch mount 412. The hitch mount 412 may be connected to a vehicle, while the tongue 422 may be attached to a corresponding tow-behind trailer. In this embodiment, the hitch mount 412 may also include, or attach to, various additional components. For instance, a hitch mount 412 may be pivotally secured to a swivel hitch 488. As shown in FIGS. 15A-15C, a rotating member 496 of a swivel hitch 488 may be connected to the top surface of the hitch mount 412. The connection between the swivel hitch 488 and the hitch mount 412 may allow the swivel hitch 488 to pivot in a side-to-side fashion. One or more pivot pins, rods, bolts, or the like, along with bushings, bearings, and the like, can facilitate pivoting of the swivel hitch 488. For instance, a bolt 497 may extend through the mount 412 and the rotating member 496, and can act as a pivot about which the rotating member 496 rotates. In some embodiments, such as that shown in FIG. 15C, the mount 412 may include multiple components. For instance, the mount 412 is shown as being an exterior layer with a flange around an interior, support layer 498. In other embodiments, the mount 412 may have a unitary construction, or may be constructed in other manners.

The pivot hitch may also be connected to an adapter 489. In this embodiment, the adapter 489 may attach to or near a rear end of the swivel hitch 488. The adapter 489 may be pivotally secured to the swivel hitch 488 in a manner that allows the adapter 489 to rotate relative to the swivel hitch 488. For instance, the adapter 489 may rotate upward and downward relative to the swivel hitch 488 and the hitch mount 412. A bolt 490, pin, rod, or the like, may be used to allow the adapter 489 to rotate. Optionally, bushings or bearings, and potentially sealed bearings, may be located within the adapter 489 and/or swivel hitch 488 to allow or facilitate such motion. In some embodiments, the bolt 490 or other pivot may extend through all or substantially all of the swivel hitch 488 and/or the adapter 489. An optional nut 495 may secure the bolt 490 in place.

As also shown in FIG. 15A, the adapter 489 may include a set of extension arms 491. The extension arms 491 may extend rearwardly and can include an opening therein. The opening may be sized to receive a trailer pin 492. The extension arms 491 may be in a spaced apart relationship sufficient to allow a portion of the tongue 422 to fit therebetween. A corresponding opening on the tongue 422 may also be aligned with the openings in the extension arms 491 to allow the trailer pin 492 to extend through the adapter 489 and the tongue 422 thereby securing the tongue 422 to the mount 412. One or more bushings, bearings, or the like may also be positioned around or within the openings in the extension arms 491 and/or the tongue 422. For instance, an example bushing made of a soft urethane material may be positioned within the opening of the tongue 422 to reduce friction with the trailer pin 492.

Optionally, the pin 492 may selectively secured in place using a fastener such as cotter pin 493. One or more washers 494 may also be placed around the trailer pin 492. As best shown in FIG. 15C, the washers 494 may be located on opposite sides of the tongue 422 and/or adjacent opposite extension arms 491. In one embodiment, one washer 494 may be fixedly secured to the trailer pin 492 while the other washer 494 may be removable. When the cotter pin 493 is secured to the trailer pin 492, the cotter pin 493 optionally abuts one of the washers 494 to maintain a washer 494 near, if not abutting, a corresponding extension arm 491.

Examples of manners in which the hitching assembly 406 may operate may better be understood in the context of FIGS. 15C-15I. In particular, FIG. 15C illustrates an exploded assembly view of the hitching assembly 406. FIGS. 15D-15I further illustrate an example embodiment in which there may be some rotation of the tongue 422 relative to a mount 412, with such rotation being facilitated and/or controlled using the hitching assembly 406.

Figure 15D:
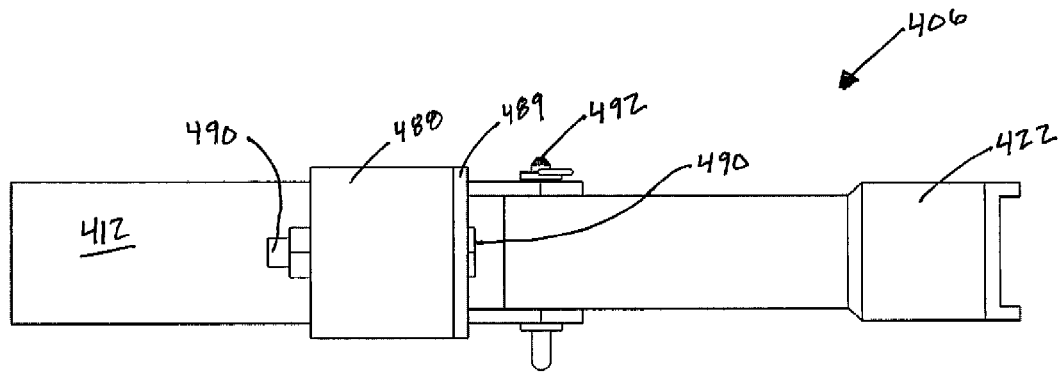
FIGS. 15D-15F illustrate top views of the example hitch of FIG. 15A, as the hitch allows rotation in one or more directions, according to an embodiment of the present disclosure.
Figure 15E:
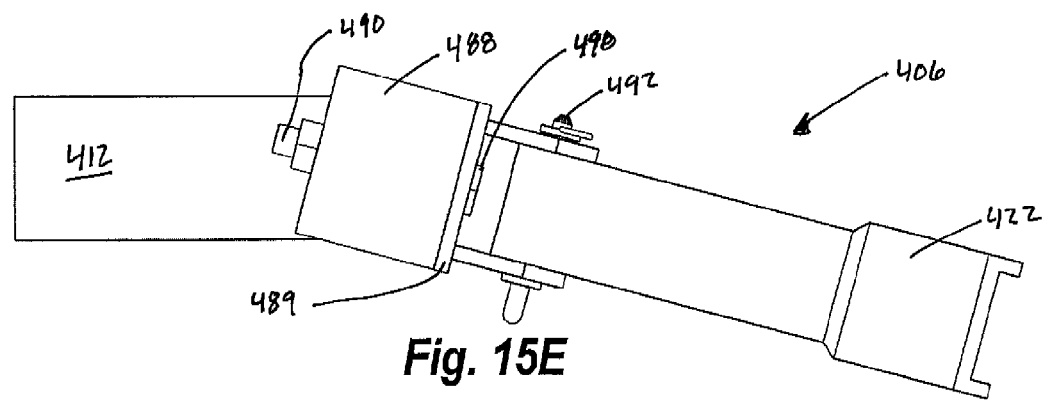
Figure 15F:
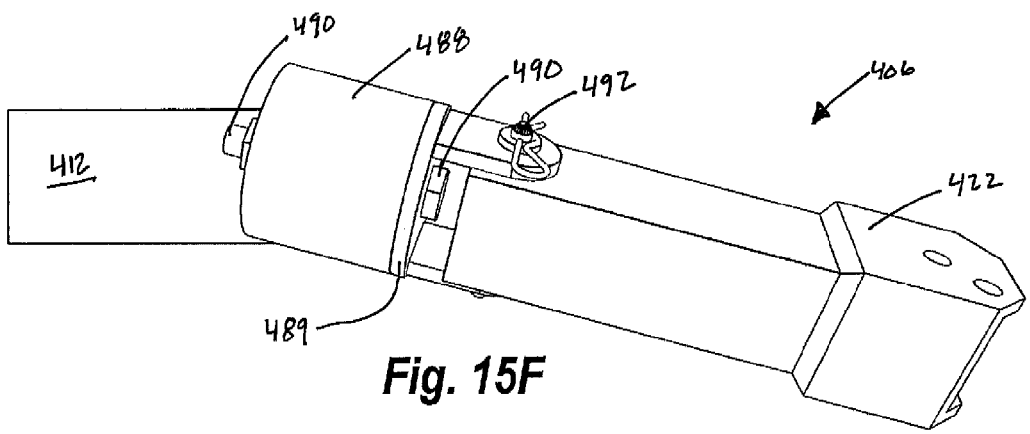
Figure 15G:
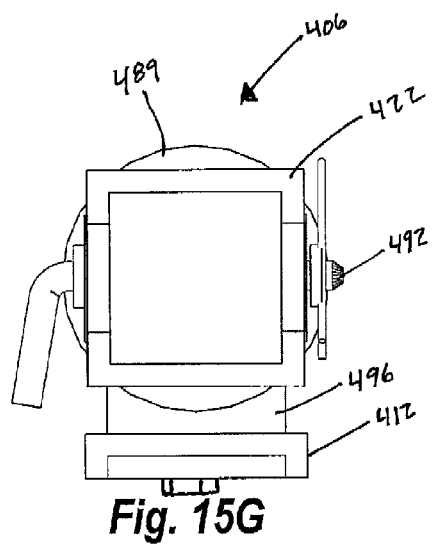
FIGS. 15G-15I illustrate rear views of the example hitch of FIG. 15A, as the hitch allows rotation in one or more directions, according to an embodiment of the present disclosure.
Figure 15I:
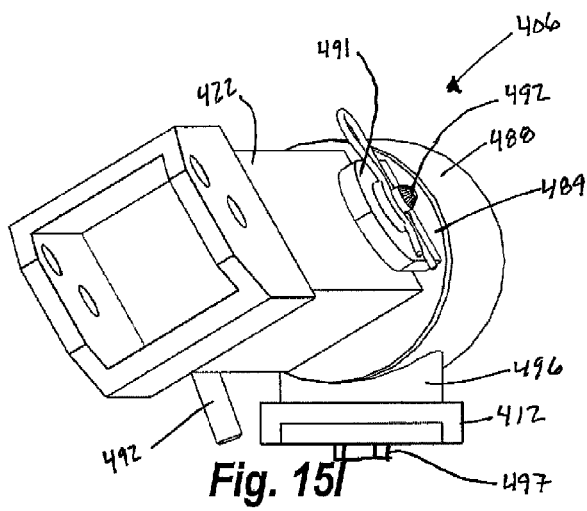
Figure 15H:
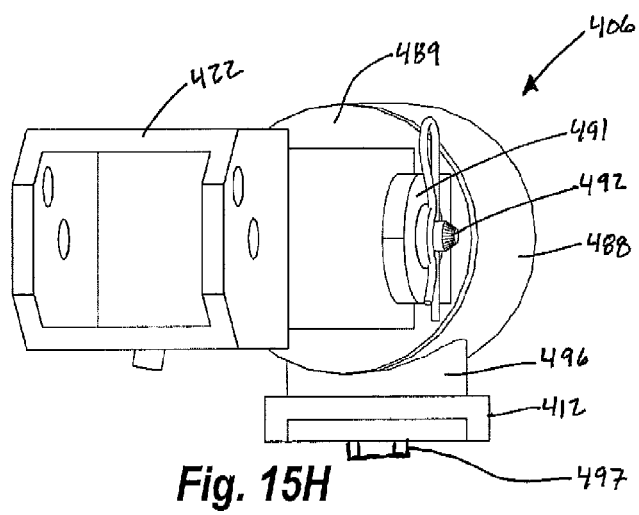

More particularly, FIGS. 15D and 15G illustrate respective side and rear views of the hitching assembly 406 when the tongue 422 is about in-line with the mount 412, and about parallel thereto. In some embodiments, and as discussed herein, the mount 412 may connect to a swivel hitch 488 which can rotate relative to the mount 412. As shown in FIGS. 15E and 15H, the swivel hitch 488 may rotate around a pivot (e.g., bolt 497). Such a pivotal motion may allow the tongue 422 to sweep side-to-side relative to the mount 412. In FIG. 15H, the side-to-side motion is shown as allowing leftward movement (although it may also be movement to the right). In the orientation shown in FIG. 15E, the side-to-side movement is shown as upward and/or downward movement.

As also discussed herein, the swivel hitch 488 may connect to an adapter 489 that may optionally pivot or rotate in an additional direction. For instance, FIGS. 15F and 15I illustrate an embodiment where in connection with side-to-side motion, the adapter 489 can rotate about a pivot (e.g., bolt 490) in an up-and-down motion. For instance, as best seen with respect to FIG. 15I which has a head-on view of the mount 15I, the adapter 489 may allow the tongue 422 to rotate in a clockwise and/or counter-clockwise direction.

The hitching assembly 406 of FIGS. 15A-15I may be one example of a hitch that may be used in connection with embodiments of the present disclosure. For instance, an off-roading trailer, or other pull-behind trailer, may be used with the hitching assembly 406. In some embodiments, a tongue 422 may extend about parallel to the mount 412, however, as the hitching assembly 406 can provide up to three degrees of freedom, the tongue 422 may also be inclined in other embodiments.

INDUSTRIAL APPLICABILITY

In general, aspects of the present disclosure may be used in a variety of different applications, and with a wide-range of vehicles, including trailers. In one aspect, the embodiments disclosed herein may be used in connection with trailers specifically designed for use with ATV or other off-road vehicles, although such embodiments are merely illustrative. In such an embodiment, a trailer may be constructed with a width corresponding directly, or approximately, to a width of the towing off-road vehicle. Optionally, the width may be slightly less to accommodate for wheel widths, desired clearance, or other factors. In one embodiment, for instance, the trailer may be about ten inches less in width relative to the towing vehicle.

While trailers of the present disclosure may be relatively long lengths, and can exceed ten or even fifteen feet in length, some embodiments of the present disclosure are related to shorter-length trailers which can be used in off-road capacities to provide relatively large approach angles. For instance, a frame may be around five feet in length from the front outside panel to the bed of the back outside panel or tailgate. A bumper may optionally also be included near the tailgate, and can have taillights thereon (although tail lights may also be in or on the frame or other components, including upright supports). The trailer may have any suitable size, however. For instance, the trailer may be up to about eight feet wide and/or about twenty-five feet in length in other embodiments. Suspension and other components of some embodiments may therefore be used even in larger trailers or vehicles. Moreover, the trailer may also be larger than about eight feet in width and/or larger than about twenty-five feet in length.

The frame itself may be formed of any material sufficient to provide the desired strength, flexibility, weight, cost, ease of use, and other characteristics. For instance, the frame may be made of steel, aluminum, other metals and alloys, polymers, composites (e.g., fiberglass, carbon fiber, etc.), organic materials, and the like. Similarly, flooring secured to the bottom of the frame, as well as panels secured to the front and side of the frame, may be made from any suitable material. For instance, aluminum or mild steel sheeting may be used, although other metals and alloys, composites, polymers, organic materials, or other materials, or any combination thereof, may also be used. Any or all of the floor, side, or front panels may also be strengthened or reinforced. For instance, a flange may be formed at the top and/or bottom of side and front panels to increase rigidity or provide a convenient mechanism for securing the side and top panels to the frame and/or flooring (e.g., using rivets, screws, welding, etc.). Any seams or joints may also be covered with a gasket or silicon-based or other sealant to seal off the interior from outside elements.

A tailgate may also be formed from the same or different materials. In one embodiment, the tailgate may include an aluminum or mild steel sheeting bent, formed, or otherwise secured to form an exterior panel. Optionally, the tailgate has an increased width relative to front and/or side panels to accommodate a handle and/or locking assembly. The locking assembly may include with rotary latches, and strike bolts or slam bolts attached to a locking paddle latch with rods. The tailgate may be fastened to the flooring and/or frame using a hinge or pivot bolts. Two or more cables may also be secured to the sides of the tailgate and to the frame and/or side panels of the trailer to suspend the tailgate when it is released and opened.

The trailer cover optionally, but not necessarily, may include a construction similar to that of the front and/or side panels, or the tailgate. The top cover may therefore also be formed of metals, alloys, polymers, composites, organic materials, other materials, or some combination thereof. Clamps may be used to secure the top cover in place; however, in some embodiments the top cover may be hinged to the front side of the trailer. One or more releasable latches in the tailgate may then be used to secure the back end of the top cover in place. Optionally, a light (e.g., a battery powered LED light) may be attached to the underside of the cover. A gasket, seal, or other component (e.g., silicone, foam rubber, etc) may attach to the underside of the cover, or to the top of the tailgate and/or front or side panels, to form a seal in the gaps between the tops of the panels and the bottom of the cover.

Some embodiments of a trailer may be for expanded use, including off-road use. Such an embodiment may have an adjustable height to accommodate different types of terrain and loading. The approach angles, however measured, may vary as the height of the trailer is adjusted. The trailer may also be scaled in length and or width for any particular application and such variations, particularly to length, may vary the approach angle. An optional adjustable suspension may include a fixed pivot along with an adjustable pivot. The fixed pivot is optionally oriented towards the front of the trailer (e.g., between eight and twenty-four inches from the front). A suspension arm, and optionally a trailing suspension arm, may extend from the pivot, and be allowed to rotate using bearings, bushings, and the like, together with a pivot pin, rod, bolt, or the like. Optionally, the suspension arm may be made of a material similar to that of the frame (e.g., 2×2" tubing). The suspension arm may also include an angled reinforcement that can also pivot, in which case the pivot may have an extended length.

The suspension arm may also optionally connect to an axle or spindle at an end opposite the pivot. A hub or wheel may be mounted to the spindle or axle. Such a wheel may be a standard or customized size (e.g., twenty inches, twenty-five inches, etc.).

Adding to the suspension may be an optional shock absorber. The optional shock absorber could be replaced by a fixed linkage. Regardless of which is used, or if an alternative is used, a pivot may be secured to, or built in, the trailing suspension arm. The shock absorber or linkage may connect to that pivot as well as to a pivot in or connected to an elongated frame member. The frame member may run lengthwise and can include multiple holes, cut-outs, or other locations. Such locations may cooperate with the pivot. An example pivot may include a 2" inner-diameter channel that can slide along the exterior, outer surface of a 2" outer-diameter frame member. Holes in the pivot may align with the positions in the frame member, and can be bolted in place to secure the pivot at a particular location. The locations may be equally spaced or spacing may be varied. The pivot may thus secure to both the frame element and to the shock absorber or linkage. When the pivot is moved, the positions of the linkage/shock absorber, and the suspension arm can change, thereby varying the height of the trailer (i.e., the clearance) and potentially the position of the wheels relative to the frame.

Where a shock absorber is used, the shock absorbers can be air, mechanical spring, gas, oil based, or use other mechanisms, or some combination thereof. When air shocks are used, an on-board compressor can optionally be located within the trailer. Suitable tubing may extend to valves used for raising and/or lowering the shock absorbers. The shock absorbers can optionally be raised and lowered independently relative to each other. An air hose may also be connected to the compressor for inflating tires, an air mattress, powering a nail gun, and the like.

Some trailers may optionally include trailer brakes, including electric brakes. In such an embodiment, an electric trailer brake may be bolted to the spindle and the corresponding hub and drum assembly. The trailer may include an on-board brake control module receiving power from an on-board or other power source. The control module may initiate the brakes via a brake wire connected to the towing vehicle. Optionally, the control module may be in a same box or location as other components (e.g., battery, air compressor, etc.).

A trailer may also include an adjustable tongue. The adjustable tongue can allow the trailer to be hauled by different vehicles which may have trailer hitches at different heights. In other embodiments, the trailer may have an adjustable height and the tongue can be adjustable to allow for use with a same vehicle following increased or decreased height of the trailer. The tongue may be formed of material similar to that of the frame. An example tongue may have three sections, including an upper section, an intermediate section, and a lower section. The upper section can extend from the front of the trailer bed. A pivot bolt may secure the upper and intermediate sections. A similar pivot bolt may secure the intermediate and lower sections. The upper and lower sections may also include a second opening for use with a locking bolt. The intermediate section may include a corresponding opening, or set of openings, to allow the locking bolt to be located therein. When the pivot bolt is in place, the intermediate section can rotate; however, by placing the locking bolt, the orientation of the intermediate section may be fixed. Optionally, the intermediate section can include multiple (e.g., 2, 3, 4, 5, 6, etc.) openings for use with the locking bolt so that the middle section can be locked at different orientations. Such orientations may vary from a range of forty-five degrees to zero degrees in one embodiment.

An example trailer may also include a fuel storage area. For instance, a pan may be secured to the upper section of the tongue to accommodate one or two fuel containers (e.g., 5 gallon containers). The pan may use similar materials as a top cover, tailgate, front/side panels, flooring, or the like.

In some embodiments, a trailer may be lightweight so as to allow easy transport over varied terrain, while also allowing easy towing by lightweight vehicles such as an ATV rated for 600-1500 pound towing. When empty, the trailer weight may be between about 125 and 300 lbs, or smaller or greater in other embodiments. An example trailer may be about 170 lbs (±20 lbs). Paneling, tubing, etc. of heavier materials (e.g., steel vs. aluminum or fiberglass) which can increase the weight. Other metals, alloys, composite materials, organic materials, polymers, and the like may also be used for various components to affect the weight. Overall, a trailer may have a weight anywhere between 125 lbs and 1000 lbs when unloaded. Such weights are merely illustrative as adjustments to the size, materials and components of the trailer can significantly increase or decrease the weight of the trailer.

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. The features illustrated or described relative to one embodiment are interchangeable and/or may be employed in combination with features of any other embodiment herein. In addition, other embodiments of the disclosure may also be devised which lie within the scopes of the disclosure and the appended claims. The scope of the present application is, therefore, indicated and limited only by the appended claims and their legal equivalents. All additions, deletions and modifications to the invention, as disclosed herein, that fall within the meaning and scopes of the claims are to be embraced by the claims.

What is claimed is:

1. A trailer, comprising:
   a frame;

at least two wheels connected to the frame;
an adjustable suspension system for varying a clearance of the frame, the adjustable suspension system including a first pivot coupled to and adjacent the frame and a second pivot coupled to and adjacent the frame, the first pivot and the second pivot being adjustably spaced along a longitudinal length of the frame, the first pivot coupled to the frame independent of the second pivot and the second pivot coupled to the frame independent of the first pivot;
a top cover positionable over an enclosure of the trailer; and
a handle, wherein the handle is configured to:
release the top cover upon being pulled a first distance; and
release a tailgate upon being pulled a second distance, the second distance being greater than the first distance.

2. The trailer recited in claim 1, wherein the adjustable suspension is configured to provide an approach angle of at least fifteen degrees.

3. The trailer recited in claim 1, wherein the suspension system includes:
a suspension arm pivotally secured to the second pivot, the suspension arm including or being connected to a third pivot; and
a shock absorber pivotally secured to the third pivot;
wherein the first pivot is pivotally secured to the shock absorber and slideably disposed relative to the frame.

4. The trailer recited in claim 1, further comprising:
a tongue with a hitch assembly connected thereto, the hitch assembly being configured to be attached to a mount of a towing vehicle, wherein the mount includes:
a swivel hitch configured to allow side-to-side pivoting of the tongue; and
an adaptor connected to the swivel hitch and configured to allow upward-and-downward rotation of the tongue.

5. The trailer recited in claim 1, further comprising:
an enclosure defined by at least three sidewalls and a tailgate; and
a release handle for opening the tailgate.

6. The trailer recited in claim 1, wherein the first pivot is moveable along the longitudinal length of the frame.

7. The trailer recited in claim 6, wherein the first pivot is moveable between discrete positions along the longitudinal length of the frame.

8. The trailer recited in claim 1, further comprising an adjustable tongue connected to the frame.

9. The trailer recited in claim 8, wherein the adjustable tongue includes an intermediate section pivotally secured to upper and lower sections of the adjustable tongue.

10. The trailer recited in claim 9, wherein the intermediate section is angled and non-perpendicular relative to the upper and the lower sections of the adjustable tongue.

11. The trailer recited in claim 9, wherein the adjustable tongue has a variable extension length and vertical drop.

12. An adjustable suspension system, comprising:
a frame member;
a first pivot directly secured to and adjacent the frame member;
a first suspension arm pivotally secured to the first pivot, the first suspension arm including or being secured to a second pivot;
a second suspension arm pivotally secured to the second pivot; and
a third pivot pivotally secured to the second suspension arm, the third pivot directly secured to and adjacent the frame member and being longitudinally moveable relative to the frame member.

13. The adjustable suspension system of claim 12, wherein the second suspension arm includes a shock absorber.

14. The adjustable suspension system of claim 12, wherein the second suspension arm has an adjustable length.

15. The adjustable suspension system of claim 12, wherein the third pivot is slideably disposed relative to the frame member.

16. The adjustable suspension system of claim 12, wherein the third pivot is longitudinally moveable between discrete locations where the third pivot may be secured to the frame member.

17. A trailer, comprising:
a frame;
at least two wheels connected to the frame;
an enclosure connected to the frame, the enclosure including at least three sidewalls, a tailgate, and a top cover;
an adjustable suspension connected to the frame, the adjustable suspension providing selectively variable clearance relative to a bottom of the at least two wheels, and selectively varied longitudinal position of the at least two wheels;
an adjustable tongue connected to the frame and including a pivotable section for pivoting to change a drop of the tongue, the adjustable tongue including a first section extending substantially perpendicularly from the frame, an intermediate section coupled to the first section via a pivot, and a second section coupled to the intermediate section via a second pivot and extending substantially perpendicular to the first section;
the adjustable suspension provides at least two suspension arms pivotally secured to the frame, a first suspension arm being secured to a fixed pivot of the frame and a second suspension arm being pivotally secured to the first suspension arm and a translatable pivot secured to the frame, and wherein the adjustable suspension is configured to selectively vary the clearance up to twenty five inches; and
the tailgate includes a handle, the handle controlling release of both the tailgate and the top cover, wherein the handle releases the top cover at a different time relative to the tailgate.

* * * * *